(12) United States Patent
Roth

(10) Patent No.: US 8,022,122 B2
(45) Date of Patent: Sep. 20, 2011

(54) DERIVATIVES OF PYRIMIDINES AS FLAME RETARDANTS

(75) Inventor: Michael Roth, Lautertal (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/226,840

(22) PCT Filed: Apr. 23, 2007

(86) PCT No.: PCT/EP2007/053948
§ 371 (c)(1),
(2), (4) Date: Oct. 29, 2008

(87) PCT Pub. No.: WO2007/128678
PCT Pub. Date: Nov. 15, 2007

(65) Prior Publication Data
US 2009/0131565 A1  May 21, 2009

(30) Foreign Application Priority Data

May 2, 2006  (EP) .................................. 06113371
Dec. 11, 2006  (EP) .................................. 06125786

(51) Int. Cl.
*C08K 5/3477* (2006.01)
*C08K 5/5313* (2006.01)

(52) U.S. Cl. ........ 524/100; 524/126; 524/139; 524/148; 252/609

(58) Field of Classification Search .................. 524/100, 524/126, 139, 148; 252/609
See application file for complete search history.

(56) References Cited

U.S. PATENT DOCUMENTS

| | | | |
|---|---|---|---|
| 4,656,209 A | 4/1987 | Wehner et al. | 524/87 |
| 5,373,038 A | 12/1994 | Horacek | 524/100 |
| 5,859,100 A | 1/1999 | Wehner et al. | 524/100 |
| 5,925,696 A | 7/1999 | Wehner et al. | 524/100 |
| 6,084,013 A * | 7/2000 | Wehner | 524/100 |
| 6,156,830 A | 12/2000 | Wehner et al. | 524/100 |
| 6,255,371 B1 | 7/2001 | Schlosser | |

FOREIGN PATENT DOCUMENTS

| | | |
|---|---|---|
| EP | 0065934 | 12/1982 |
| EP | 0661342 | 7/1995 |
| EP | 1304352 | 4/2003 |
| EP | 1630203 | 3/2006 |
| WO | 00/12608 | 3/2000 |
| WO | 03/082967 | 10/2003 |

* cited by examiner

*Primary Examiner* — Kriellion Sanders
(74) *Attorney, Agent, or Firm* — Tyler A. Stevenson

(57) ABSTRACT

The present invention pertains to a composition comprising an organic polymer, a derivative of a pyrimidine and a further flame retardant. The present invention also pertains to a process for flame retarding an organic polymer by applying thereto or incorporating therein a derivative of a pyrimidine, optionally in combination with a further flame retardant.

20 Claims, No Drawings

DERIVATIVES OF PYRIMIDINES AS FLAME RETARDANTS

The present invention pertains to a composition comprising an organic polymer, a derivative of a pyrimidine and a further flame retardant. The present invention also pertains to a process for flame retarding an organic polymer by applying thereto or incorporating therein a derivative of a pyrimidine, optionally in combination with a further flame retardant.

WO-A-03/082967 discloses derivatives of pyrimidines such as 6-aminouracil, 6-amino-1-methyluracil or 6-amino-1,3-dimethyluracil as stabilizers in polyester. Derivatives of nucleobases are described as flame retardants in polymers in EP-A-1,304,352, WO-A-00/12,608, EP-A-0,661,342 and EP-A-1,630,203.

U.S. Pat. No. 5,925,696 describes stabilizer mixtures for chlorine containing polymers.

U.S. Pat. No. 5,859,100 discloses rigid PVC stabilized with N,N-dimethyl-6-aminouracils.

U.S. Pat. No. 4,656,209 describes chlorinated thermoplastics stabilized with aminouracils.

EP-A-65,934 also discloses chlorine containing thermoplastic resins stabilized with aminouracils.

U.S. Pat. No. 6,156,830 relates to 5-substituted 6-aminouracils as stabilizers for halogenated polymers.

U.S. Pat. No. 5,373,038 describes flame resistant plastics containing guanidine barbiturates or guanidine thiobarbiturates.

The compounds of formula (I)-(XII) can be advantageously used as flame retardants, especially in organic polymers. They may have improved thermal stability and less or no corrosive behaviour. They are especially useful for the manufacture of flame retarded injection molded articles, for instance, for electrical or electronic applications. The present flame retardants can be especially resistant to hydrolysis, so contact with water may not diminish their flame retarding capability. Dripping of compositions comprising the present flame retardants may be significantly reduced while the compositions are on fire. The present compounds of formula (I)-(XII) may replace halogenated flame retardants, antimony compounds and/or fillers or at least their amount can be reduced by the present compounds of formula (I)-(XII).

Of interest is a composition comprising the components
a) an organic polymer with the proviso that the organic polymer is different from a vinyl chloride polymer or vinyl chloride copolymer,
b) a compound of formula (I)-(XII), and
c) a further flame retardant,

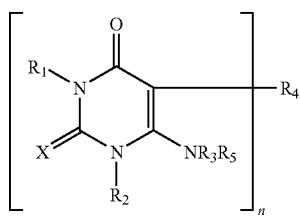

(I)

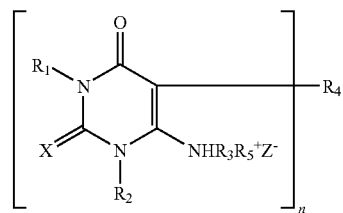

(II)

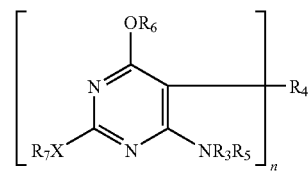

(III)

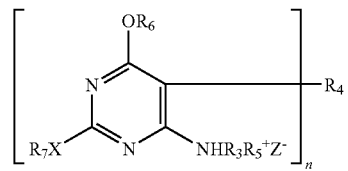

(IV)

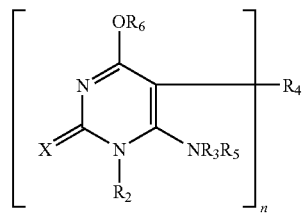

(V)

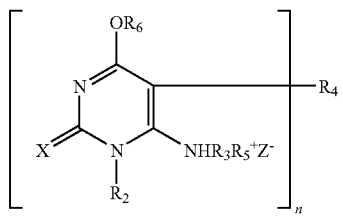

(VI)

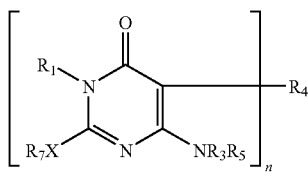

(VII)

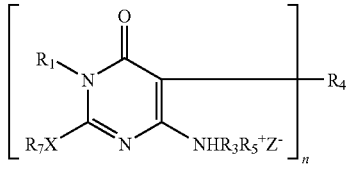

(VIII)

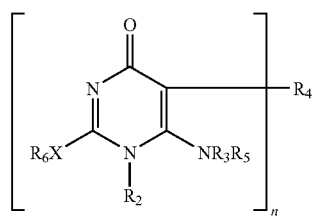

(IX)

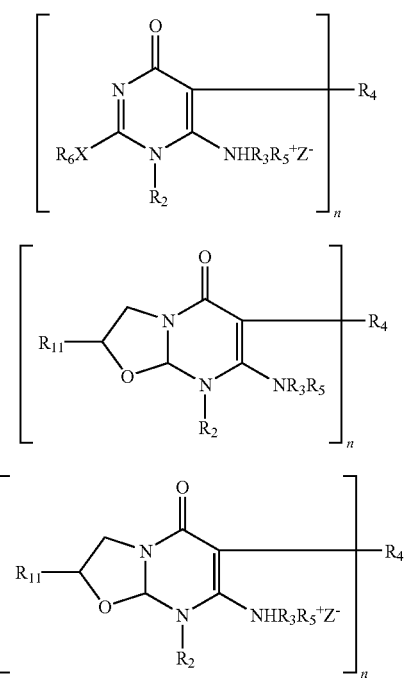

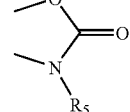

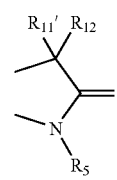

wherein
n is 1 or 2,
X is O, S or NH,
$Z^-$ is an anion of an inorganic acid,
$R_1$ and $R_2$ are independently of each other H, glycidyl, COO—$R_8$, OCO—$R_9$, CO—$R_9$, CO—$NR_8R_{10}$ or an unsubstituted or substituted radical selected from the group consisting of $C_1$-$C_{18}$alkyl, $C_3$-$C_{18}$alkenyl, $C_3$-$C_6$alkynyl, $C_5$-$C_8$cycloalkyl, $C_5$-$C_8$cycloalkenyl, $C_6$-$C_{12}$aryl, $C_7$-$C_{14}$aralkyl, $C_8$-$C_{12}$aralkenyl, $C_8$-$C_{12}$aralkynyl, $C_1$-$C_{18}$alkoxy, $C_3$-$C_{18}$alkenyloxy, $C_3$-$C_6$alkynyloxy, $C_6$-$C_{12}$aryloxy and $C_7$-$C_{14}$aralkoxy,
$R_3$ and $R_5$ are independently of each other as defined for $R_1$,
$NR_3R_5$ and $R_4$ can furthermore together be part of an anellated 5-membered ring system of formulae (XIIIa)-(XIIIe),

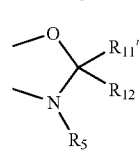

in case n is 1,
$R_4$ is halogen, NO, CN, $NR_3R_5$, $NHR_3R_5^+Z^-$, furanonyl or as defined for $R_1$,
in case n is 2,
$R_4$ is an unsubstituted or substituted biradical selected from the group consisting of $C_1$-$C_{18}$alkylene and $C_7$-$C_{14}$aralkylene,
$R_6$ is as defined for $R_1$,
$R_7$ is as defined for $R_2$,
$R_8$ and $R_{10}$ are independently of each other H or as defined for $R_9$;
$R_9$ is an unsubstituted or substituted radical selected from the group consisting of $C_1$-$C_{18}$alkyl, $C_3$-$C_{18}$alkenyl, $C_3$-$C_6$alkynyl, $C_5$-$C_8$cycloalkyl, $C_5$-$C_8$cycloalkenyl, $C_6$-$C_{12}$aryl, $C_7$-$C_{14}$aralkyl, $C_8$-$C_{12}$aralkenyl and $C_8$-$C_{12}$aralkynyl,
the substituted alkylene, aralkylene, alkyl, alkenyl, alkynyl, cycloalkyl, cycloalkenyl, aryl, aralkyl, aralkenyl, aralkynyl, alkoxy, alkenyloxy, alkynyloxy, aryloxy and aralkoxy are substituted by one or more radicals selected from the group consisting of halogen, hydroxy, nitro, cyano, COO—$R_{13}$, $CONR_{13}R_{14}$, OCO—$R_{15}$, $NR_{13}CO$—$R_{15}$, $NR_{13}R_{14}$, CO—$R_{15}$ and O—$R_{15}$,
or the substituted aralkylene, aryl, aralkyl, aralkenyl, aralkynyl, aryloxy and aralkoxy are substituted at the aryl by one or more radicals selected from the group consisting of $C_1$-$C_{18}$alkyl, $C_3$-$C_{18}$alkenyl and $C_3$-$C_6$alkynyl,
$R_{11}'$ is H, $C_1$-$C_{18}$alkyl, $C_3$-$C_{18}$alkenyl, $C_3$-$C_6$alkynyl, $C_5$-$C_8$cycloalkyl, $C_5$-$C_8$cycloalkenyl, $C_6$-$C_{12}$aryl, $C_7$-$C_{14}$aralkyl, $C_8$-$C_{12}$aralkenyl, $C_8$-$C_{12}$aralkynyl, COO—$R_{13}$, $CONR_{13}R_{14}$, OCO—$R_{15}$, $NR_{13}CO$—$R_{15}$, $NR_{13}R_{14}$ or CO—$R_{15}$,
$R_{11}$ and $R_{12}$ are independently of each other or O—$R_{15}$ or as defined for $R_{11}'$,
$R_{13}$ and $R_{14}$ are independently of each other H or as defined for $R_{15}$,
$R_{15}$ is $C_1$-$C_{18}$alkyl, $C_3$-$C_{18}$alkenyl, $C_3$-$C_6$alkynyl, $C_5$-$C_8$cycloalkyl, $C_5$-$C_8$cycloalkenyl, $C_6$-$C_{12}$aryl, $C_7$-$C_{14}$aralkyl, $C_8$-$C_{12}$aralkenyl or $C_8$-$C_{12}$aralkynyl.

Preferred is a composition, wherein the compound of formula (I)-(XII) is present in an amount from 0.1% to 25.0%, preferably 0.1% to 20%, and the further flame retardant is present in an amount from 0.5% to 45.0%, based on the weight of the organic polymer.

The weight ratio of component b) to component c) is preferably 1:10 to 10:1.

Preferably, the compound of formula (I)-(XII) is a compound of formula (I)-(X), especially a compound of formula (I).

Examples, amount, preferences and processing for compounds of formula (I)-(XII) can be as outlined below.

The definitions and examples given below apply to all such terms herein.

For example, $Z^-$ is an anion of an inorganic acid like $HSO_4^-$, $HSO_3^-$, $H_2PO_4^-$, $H_2BO_3^-$, $HBO_2^-$, $Cl^-$, $Br^-$, $ClO_4^-$, $C_1$-$C_6$ dialkylphosphinate, methylphosphonate, phenylphosphonate, polyphosphate, pyrophosphate or as defined herein elsewhere.

The term alkyl comprises, for example, methyl, ethyl, n-propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, 2-methylheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, n-nonyl, n-decyl, n-undecyl, 1-methylundecyl, n-dodecyl, n-pentadecyl, n-hexadecyl and n-octadecyl.

For instance, cycloalkyl is cyclopentyl, cyclohexyl, methylcyclopentyl, dimethylcyclopentyl, methylcyclohexyl, cycloheptyl or cyclooctyl. Cycloalkyl is not preferred in compounds of formula (I)-(XII).

Examples of alkenyl are allyl, and the branched and unbranched isomers of butenyl, pentenyl, hexenyl, heptenyl, octenyl, nonenyl, decenyl, undecenyl and dodecenyl. The term alkenyl also comprises residues with more than one double bond that may be conjugated or non-conjugated, for example may comprise one double bond.

For instance, cycloalkenyl is cyclopentenyl, cyclohexenyl, methylcyclopentenyl, dimethyl-cyclopentenyl or methylcyclohexenyl. Cycloalkenyl may comprise more than one double bond that may be conjugated or non-conjugated, for example may comprise one double bond. Cycloalkenyl is not preferred.

Examples of alkynyl are 1-propynyl, 2-propynyl, butynyl, pentynyl, hexynyl, heptynyl, octynyl, nonynyl, decynyl, undecynyl and dodecynyl. The term alkynyl comprises residues with one or more triple bonds with optionally one or more double bonds whereby the unsaturated bonds may be conjugated or non-conjugated, for example comprises one triple bond. Alkynyl is not preferred.

Aryl is for instance phenyl or naphthyl, preferably phenyl.

Aralkyl is for example benzyl, 1- or 2-phenylethyl, 3-phenylpropyl or 1,1-dimethylbenzyl, preferably benzyl.

An example of an aralkenyl is 2-phenylethenyl, an example of an aralkynyl is 2-phenylethynyl.

The term alkoxy comprises, for example, methoxy and ethoxy and the branched and unbranched isomers of propoxy, butoxy, pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy and octadecyloxy.

For example, cycloalkoxy means that a cycloalkyl group as defined above is connected to O.

For example, alkenyloxy means that an alkenyl group as defined above is connected to O. Alkenyloxy is not preferred.

For example, alkynyloxy means that an alkynyl group as defined above is connected to O. Alkynyloxy is not preferred.

For example, aryloxy means that an aryl group as defined above is connected to O.

For example, aralkoxy means that an aralkyl group as defined above is connected to O.

Examples of halogen are F, Cl, Br and I, especially Cl and Br, in particular Cl.

Examples of alkylene are methylene, ethylene, propylene, isopropylene, n-butylene, sec-butylene, isobutylene, tert-butylene, 2-ethylbutylene, n-pentylene, isopentylene, 1-methyl-pentylene, 1,3-dimethylbutylene, n-hexylene, 1-methylhexylene, n-heptylene, 2-methyl-heptylene, 1,1,3,3-tetramethylbutylene, 1-methylheptylene, 3-methylheptylene, n-octylene, 2-ethylhexylene, 1,1,3-trimethylhexylene, 1,1,3,3-tetramethylpentylene, nonylene, decylene, undecylene, 1-methylundecylene and dodecylene.

Examples of cycloalkylene are cyclopentylene, 1-methylcyclopentylene, cyclohexylene, 1-methylcyclohexylene, cycloheptylene, 2-methylcycloheptylene, 1-methylcycloheptylene, 3-methylcycloheptylene, cyclooctylene, 2-ethylcyclohexylene, 1,1,3-trimethylcyclohexylene, 1,1,3,3-tetramethylcyclopentylene, cyclononylene, cyclodecylene, cycloundecylene, 1-methylcycloundecylene and cyclododecylene.

Examples of cycloalkenylene are cyclopentenylene, 1-methylcyclopentenylene, cyclohexenylene, 1-methylcyclohexenylene, cycloheptenylene, 2-methylcycloheptenylene, 1-methylcycloheptenylene, 3-methylcycloheptenylene, cyclooctenylene, 2-ethylcyclohexenylene, 1,1,3-trimethylcyclohexenylene, 1,1,3,3-tetramethylcyclopentenylene, cyclononenylene, cyclodecenylene, cycloundecenylene, 1-methylcycloundecenylene and cyclododecenylene.

Aralkylene is, for example, benzylene, 1- or 2-phenylethylene, 3-phenylpropylene or 1,1-dimethylbenzylene, preferably benzylene.

Arylene is, for example, phenylene.

Alkylarylene is, for example, methyl phenylene or dimethyl phenylene.

Preferably, the further flame retardant is selected from the group consisting of phosphorus containing flame retardants, nitrogen containing flame retardants, halogenated flame retardants and inorganic flame retardants, especially phosphorus containing flame retardants and nitrogen containing flame retardants.

Most preferably, the further flame retardant is selected from the group consisting of melamine base flame retardants, sterically hindered alkoxy amine compounds, dihydro oxa phosphophenantrene oxides, organic phosphate esters, salts of an organic phosphinic acid and salts of an organic diphosphinic acid or a salt of phosphinic acid or diphosphinic acid.

Of interest is a further flame retardant which is for example a melamine based flame retardant, for instance a sterically hindered alkoxy amine compound, for example a dihydro oxa phosphophenantrene oxide, for example an organic phosphate ester, for instance a salt of an organic phosphinic acid, for instance a salt of an organic diphosphinic acid or a salt of phosphinic acid or diphosphinic acid.

Examples, amount, preferences and processing of further flame retardants are as outlined below.

Also of interest is a composition, additionally comprising at least one further additive.

Preferably, the further additive is selected from the group consisting of antioxidants, UV absorbers, light stabilisers, metal deactivators, phosphites, phosphonites, hydroxylamines, nitrones, thiosynergistic compounds, peroxide-destroying compounds, polyamide stabilisers, basic co-stabilisers, nucleating agents, fillers, reinforcing agents, plasticisers, lubricants, emulsifiers, pigments, rheology additives, catalysts, flow improvers, optical brighteners, antistatics, blowing agents, benzofuranones and indolinones.

Examples, amount, preferences and processing of further additives are as outlined below.

Of interest is a process for flame retarding an organic polymer by applying thereto or incorporating therein a compound of formula (I)-(XII).

Preferences are as for the composition above.

Of particular interest is a process for flame retarding an organic polymer by applying thereto or incorporating therein a compound of formula (I)-(XII) as flame retardant, wherein n is 1 or 2, X is O, S or NH, $Z^-$ is $HSO_4^-$, $\frac{1}{2}SO_4^{2-}$, $HSO_3^-$, $\frac{1}{2}SO_3^{2-}$, $H_2PO_4^-$, $\frac{1}{2}HPO_4^{2-}$, $\frac{1}{3}PO_4^{3-}$, $H_3P_2O_7^-$, $\frac{1}{2}H_2P_2O_7^{2-}$, $\frac{1}{3}HP_2O_7^{3-}$, $\frac{1}{4}P_2O_7^{4-}$, $H_4P_3O_{10}^-$, $\frac{1}{2}H_3P_3O_{10}^{2-}$, $\frac{1}{3}H_2P_3O_{10}^{3-}$, $\frac{1}{4}H_3P_3O_{10}^{4-}$, $\frac{1}{5}H_3P_3O_{10}^{5-}$, $H_5P_4O_{13}^-$, $\frac{1}{2}H_4P_4O_{13}^{2-}$, $\frac{1}{3}H_3P_4O_{13}^{3-}$, $\frac{1}{4}H_2P_4O_{13}^{4-}$, $\frac{1}{5}HP_4O_{13}^{5-}$, $\frac{1}{6}P_4O_{13}^{6-}$, $H_2PO_2^-$, $H_2PO_3^-$, $\frac{1}{2}HPO_3^{2-}$, $H_2BO_3^-$, $HBO_2^-$, $Cl^-$, $Br^-$, $I^-$, $ClO_4^-$, $(C_1\text{-}C_6\text{alkyl})_2PO_2^-$, $(C_1\text{-}C_6\text{alkyl})HPO_3^-$ or $\frac{1}{2}(C_1\text{-}C_6\text{alkyl})PO_3^{2-}$, $R_1$ and $R_2$ are independently of each other H, glycidyl, $COO-R_8$, $OCO-R_9$, $CO-R_9$, $CO-NR_8R_{10}$ or an unsubstituted or substituted radical selected from the group consisting of $C_1\text{-}C_{18}$alkyl, $C_3\text{-}C_{18}$alkenyl, $C_5\text{-}C_8$cycloalkyl, $C_5\text{-}C_8$cycloalkenyl, $C_6\text{-}C_{12}$aryl, $C_7\text{-}C_{14}$aralkyl, $C_8\text{-}C_{12}$aralkenyl, $C_1\text{-}C_{18}$alkoxy, $C_3\text{-}C_{18}$alkenyloxy, $C_6\text{-}C_{12}$aryloxy and $C_7\text{-}C_{14}$aralkoxy, $R_3$ and $R_5$ are independently of each other as defined for $R_1$, $NR_3R_5$ and $R_4$ can furthermore together be part of an anellated 5-membered ring system of formulae (XIIIa)-(XIIIe),

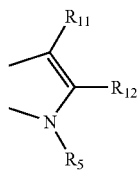
(XIIIa)

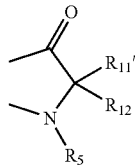
(XIIIb)

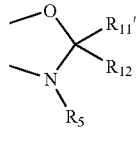
(XIIIc)

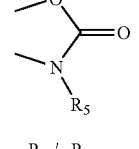
(XIIId)

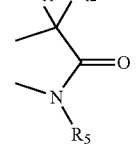
(XIIIe)

in case n is 1,
$R_4$ is halogen, NO, CN, $NR_3R_5$, $NHR_3R_5^+Z^-$, furanonyl or as defined for $R_1$,
in case n is 2,
$R_4$ is an unsubstituted or substituted biradical selected from the group consisting of $C_1\text{-}C_{18}$alkylene and $C_7\text{-}C_{14}$aralkylene,
$R_6$ is as defined for $R_1$,
$R_7$ is as defined for $R_2$,
$R_8$ and $R_{10}$ are independently of each other H or as defined for $R_9$;
$R_9$ is an unsubstituted or substituted radical selected from the group consisting of $C_1\text{-}C_{18}$alkyl, $C_3\text{-}C_{18}$alkenyl, $C_5\text{-}C_8$cycloalkyl, $C_5\text{-}C_8$cycloalkenyl, $C_6\text{-}C_{12}$aryl, $C_7\text{-}C_{14}$aralkyl and $C_8\text{-}C_{12}$aralkenyl, the substituted alkylene, aralkylene, alkyl, alkenyl, cycloalkyl, cycloalkenyl, aryl, aralkyl, aralkenyl, alkoxy, alkenyloxy, aryloxy and aralkoxy are substituted by one or more radicals selected from the group consisting of halogen, hydroxy, nitro, cyano, $COO-R_{13}$, $CONR_{13}R_{14}$, $OCO-R_{15}$, $NR_{13}CO-R_{15}$, $NR_{13}R_{14}$, $CO-R_{15}$ and $O-R_{15}$, or the substituted aryl, aralkylene, aralkyl, aralkenyl, aryloxy and aralkoxy are substituted at the aryl by one or more radicals selected from the group consisting of $C_1\text{-}C_{18}$alkyl and $C_3\text{-}C_{18}$alkenyl, $R_{11}'$ is H, $C_1\text{-}C_{18}$alkyl, $C_3\text{-}C_{18}$alkenyl, $C_5\text{-}C_8$cycloalkyl, $C_5\text{-}C_8$cycloalkenyl, $C_6\text{-}C_{12}$aryl, $C_7\text{-}C_{14}$aralkyl, $C_8\text{-}C_{12}$aralkenyl, $COO-R_{13}$, $CONR_{13}R_{14}$, $OCO-R_{15}$, $NR_{13}CO-R_{15}$, $NR_{13}R_{14}$ or $CO-R_{15}$, $R_{11}$ and $R_{12}$ are independently of each other $O-R_{15}$ or as defined for $R_{11}'$, $R_{13}$ and $R_{14}$ are independently of each other H or as defined for $R_{15}$, $R_{15}$ is $C_1\text{-}C_{18}$alkyl, $C_3\text{-}C_{18}$alkenyl, $C_5\text{-}C_8$cycloalkyl, $C_5\text{-}C_8$cycloalkenyl, $C_6\text{-}C_{12}$aryl, $C_7\text{-}C_{14}$aralkyl or $C_8\text{-}C_{12}$aralkenyl.

Of special interest is a process for flame retarding an organic polymer, by applying thereto or incorporating therein a compound of formula (I)-(XII), wherein n is 1 or 2, X is O or NH, $Z^-$ is $HSO_4^-$, $\frac{1}{2}SO_4^{2-}$, $HSO_3^-$, $\frac{1}{2}SO_3^{2-}$, $H_2PO_4^-$, $\frac{1}{2}HPO_4^{2-}$, $\frac{1}{3}PO_4^{3-}$, $H_2PO_2^-$, $H_2PO_3^-$, $\frac{1}{2}HPO_3^{2-}$, $Cl^-$, $Br^-$, $I^-$, $(C_1\text{-}C_6\text{alkyl})_2PO_2$, $(C_1\text{-}C_6\text{alkyl})HPO_3^-$ or $\frac{1}{2}(C_1\text{-}C_6\text{alkyl})PO_3^{2-}$, $R_1$ and $R_2$ are independently of each other H, glycidyl, $COO-R_8$, $OCO-R_9$, $CO-R_9$, or an unsubstituted or substituted radical selected from the group consisting of $C_1\text{-}C_{18}$alkyl, $C_3\text{-}C_6$alkenyl, $C_6$aryl, $C_7\text{-}C_{14}$aralkyl, $C_1\text{-}C_{18}$alkoxy, $C_6\text{-}C_{12}$aryloxy and $C_7\text{-}C_{14}$aralkoxy, $R_3$ and $R_5$ are independently of each other as defined for $R_1$, $NR_3R_5$ and $R_4$ can furthermore together be part of an anellated 5-membered ring system of formulae (XIIIa)-(XIIIe),

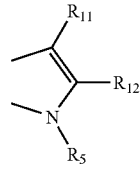
(XIIIa)

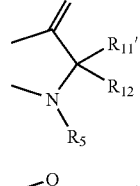
(XIIIb)

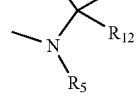
(XIIIc)

-continued

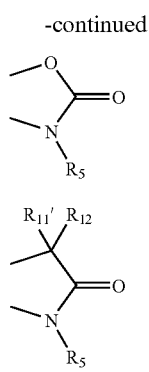

in case n is 1,
$R_4$ is halogen, NO, CN, $NR_3R_5$, $NHR_3R_5{}^+Z^-$, furanonyl or as defined for $R_1$,
in case n is 2,
$R_4$ is an unsubstituted or substituted biradical selected from the group consisting of $C_1$-$C_{18}$alkylene and $C_7$-$C_{14}$aralkylene,
$R_6$ and $R_7$ are H,
$R_8$ is H or as defined for $R_9$;
$R_9$ is an unsubstituted or substituted radical selected from the group consisting of $C_1$-$C_{18}$alkyl, $C_3$-$C_6$alkenyl, $C_6$aryl and $C_7$-$C_{14}$aralkyl,
the substituted alkylene, aralkylene, alkyl, alkenyl, aryl, aralkyl, alkoxy, aryloxy and aralkoxy are substituted by one or more radicals selected from the group consisting of halogen, hydroxy, nitro, cyano, COO—$R_{13}$, OCO—$R_{15}$, $NR_{13}R_{14}$, CO—$R_{15}$ and O—$R_{15}$,
or the substituted aryl, aralkylene, aralkyl, aryloxy and aralkoxy are substituted at the aryl by one or more radicals selected from the group consisting of $C_1$-$C_{18}$alkyl and $C_3$-$C_6$alkenyl,
$R_{11}'$ is H, $C_1$-$C_{18}$alkyl, $C_3$-$C_6$alkenyl, $C_6$aryl, $C_7$-$C_{14}$aralkyl, COO—$R_{13}$, OCO—$R_{15}$, $NR_{13}R_{14}$ or CO—$R_{15}$,
$R_{11}$ and $R_{12}$ are independently of each other O—$R_{15}$ or as defined for $R_{11}'$,
$R_{13}$ and $R_{14}$ are independently of each other H or as defined for $R_{15}$,
$R_{15}$ is $C_1$-$C_{18}$alkyl, $C_3$-$C_6$alkenyl, $C_6$aryl or $C_7$-$C_{14}$aralkyl.

Of further interest is a process for flame retarding an organic polymer by applying thereto or incorporating therein a compound of formula (I)-(X), wherein
n is 1,
X is O or NH,
$Z^-$ is $H_2PO_4{}^-$, $HSO_4{}^-$, ½$SO_4{}^{2-}$, $Cl^-$ or $Br^-$,
$R_1$ and $R_2$ are independently of each other H or an unsubstituted radical selected from the group consisting of $C_1$-$C_{18}$alkyl and $C_3$-$C_6$alkenyl,
$R_3$ and $R_5$ are independently of each other as defined for $R_1$,
$R_4$ is $NR_3R_5$, $NHR_3R_5{}^+Z^-$ or as defined for $R_1$,
$R_6$ and $R_7$ are H.

Of very particular interest is a process for flame retarding an organic polymer by applying thereto or incorporating therein a compound of formula (I), wherein
n is 1,
X is O,
$R_1$ and $R_2$ are independently of each other H or $C_1$-$C_6$alkyl, and
$R_3$, $R_4$ and $R_5$ are independently of each other as defined for $R_1$.

Of very special interest is a process for flame retarding an organic polymer by applying thereto or incorporating therein a compound of formula (I), wherein
n is 1,
X is O,
$R_1$ and $R_2$ are independently of each other H or $C_1$-$C_6$alkyl, and
$R_3$, $R_4$ and $R_5$ are H.

Especially of interest are compounds of formula (I)-(XII), which correspond to the following formulae (including for instance their tautomeric forms):

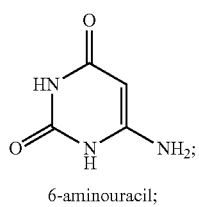
6-aminouracil;

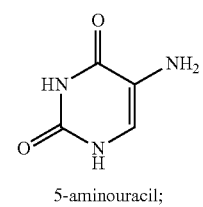
5-aminouracil;

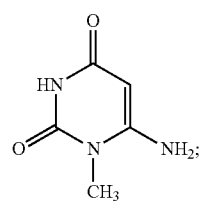
1-methyl-6-aminouracil;   1,3-dimethyl-6-aminouracil;

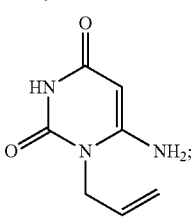
1-allyl-6-aminouracil;

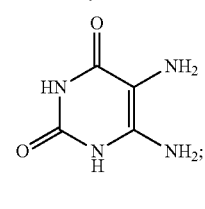
5,6-diaminouracil;

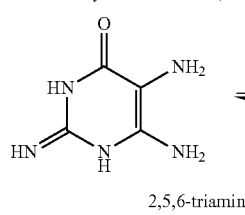
2,5,6-triamino-4-pyrimidinone;

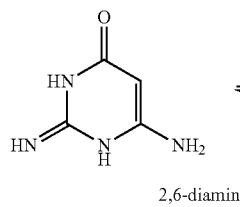
2,6-diamino-4-pyrimidinone;

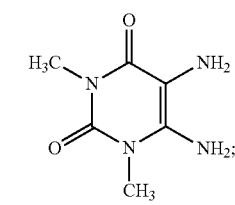
1,3-dimethyl-4,5-diaminouracil;

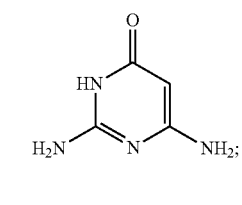
2,6-diaminouracil;

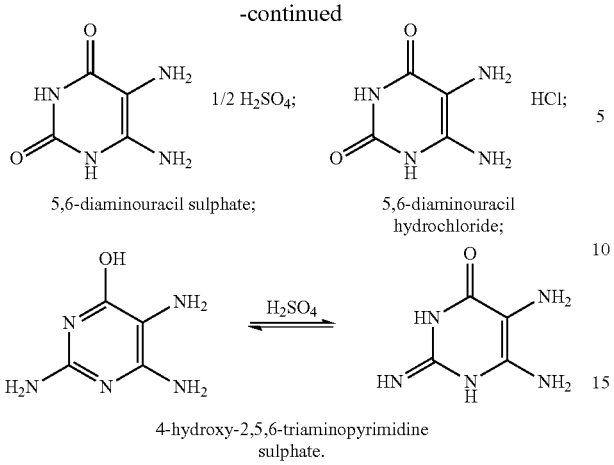

5,6-diaminouracil sulphate;

5,6-diaminouracil hydrochloride;

4-hydroxy-2,5,6-triaminopyrimidine sulphate.

Particularly preferred is 6-aminouracil, 5-aminouracil, 6-amino-1,3-dimethyluracil or a phosphoric acid salt of 6-aminouracil.

For instance, compounds of formula (I)-(XII) are known compounds, items of commerce or can be obtained by known methods.

Preferred is a process for flame retarding an organic polymer by applying thereto or incorporating therein a compound of formula (I)-(XII) in combination with at least one further flame retardant.

For instance, the further flame retardant is selected from the group consisting of phosphorus containing flame retardants, nitrogen containing flame retardants, halogenated flame retardants and inorganic flame retardants, especially phosphorus containing flame retardants and nitrogen containing flame retardants. The halogenated flame retardants are of less interest than the other further flame retardants.

Preferably, the further flame retardant is a melamine or urea based flame retardant, a sterically hindered alkoxy amine compound, a dicumyl compound, a dihydro oxa phosphophenantrene oxide, an organic phosphate ester, a salt of an organic phosphinic acid, a salt of an organic diphosphinic acid or a salt of phosphinic acid or diphosphinic acid.

Of interest is a further flame retardant which is for example a melamine based flame retardant, for instance a sterically hindered alkoxy amine compound, for example a dihydro oxa phosphophenantrene oxide, for example an organic phosphate ester, for instance a salt of an organic phosphinic acid, for instance a salt of an organic diphosphinic acid.

The further flame retardants can be known compounds, items of commerce or can be obtained by known methods.

The phosphorus-containing flame retardant is advantageously a salt of melamine, or a condensation product thereof, with a phosphorus-containing acid, namely a monobasic phosphorus-containing acid, e.g. a phosphoric, phosphonic or, preferably, phosphinic acid having in each case only one acid equivalent; more especially, alkylphosphonic acid esters and, preferably, alkylphosphinic acid esters come into consideration. The cationic component is, for example, melamine, melam, melem or a higher condensation product of melamine, preferably melamine or melam. Such salts and their preparation are described, for example, in EP-A-363 321 and WO-A-01/57051.

Especially suitable as phosphorus containing flame retardants are salts of organic phosphinic acids or diphosphinic acids, especially salts of formulae (100) and (101)

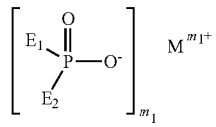 (100)

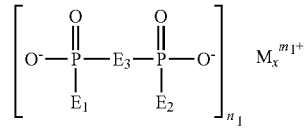 (101)

wherein $E_1$ and $E_2$, which are the same or different, are hydrogen, $C_1$-$C_6$alkyl, especially $C_1$-$C_4$alkyl, or $C_6$-$C_{10}$aryl;

$E_3$ is $C_1$-$C_{10}$alkylene, $C_6$-$C_{10}$arylene, $C_6$-$C_{10}$alkylarylene or $C_6$-$C_{10}$aralkylene;

M is magnesium, calcium, aluminium, zinc, melamine or a condensation product of melamine, $m_1$ is 1, 2 or 3;

$n_1$ is 1 or 3 and x is 1 or 2.

M is preferably Zn, Al, melamine, melam or melem, especially Zn or Al. Aryl and arylene, alkylarylene and arylalkylene include, inter alia, phenyl, naphthyl, tolyl, xylyl, ethylphenyl, mesityl, propylphenyl or tert-butylphenyl and phenylene, naphthylene, methylphenylene, ethylphenylene or tert-butylphenylene, methylnaphthylene, ethylnaphthylene, tert-butyl-naphthylene, phenylmethylene, phenylpropylene and the corresponding tolyl and xylyl analogues.

For instance, phosphorus containing flame retardants are dihydro oxa phosphophenantrene oxide, especially of the formula

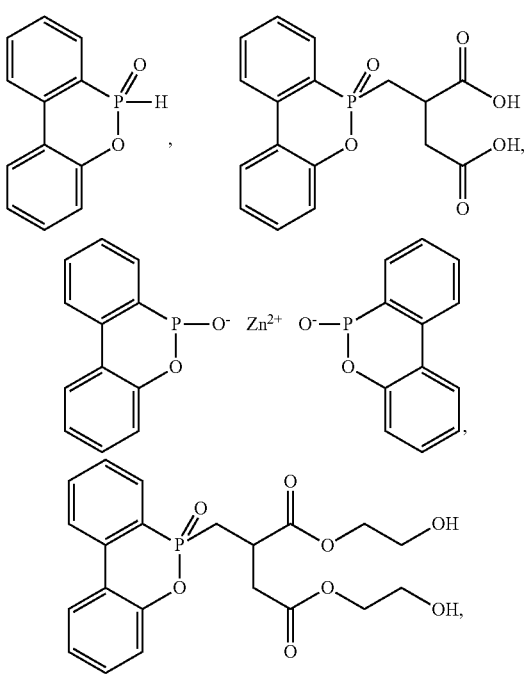

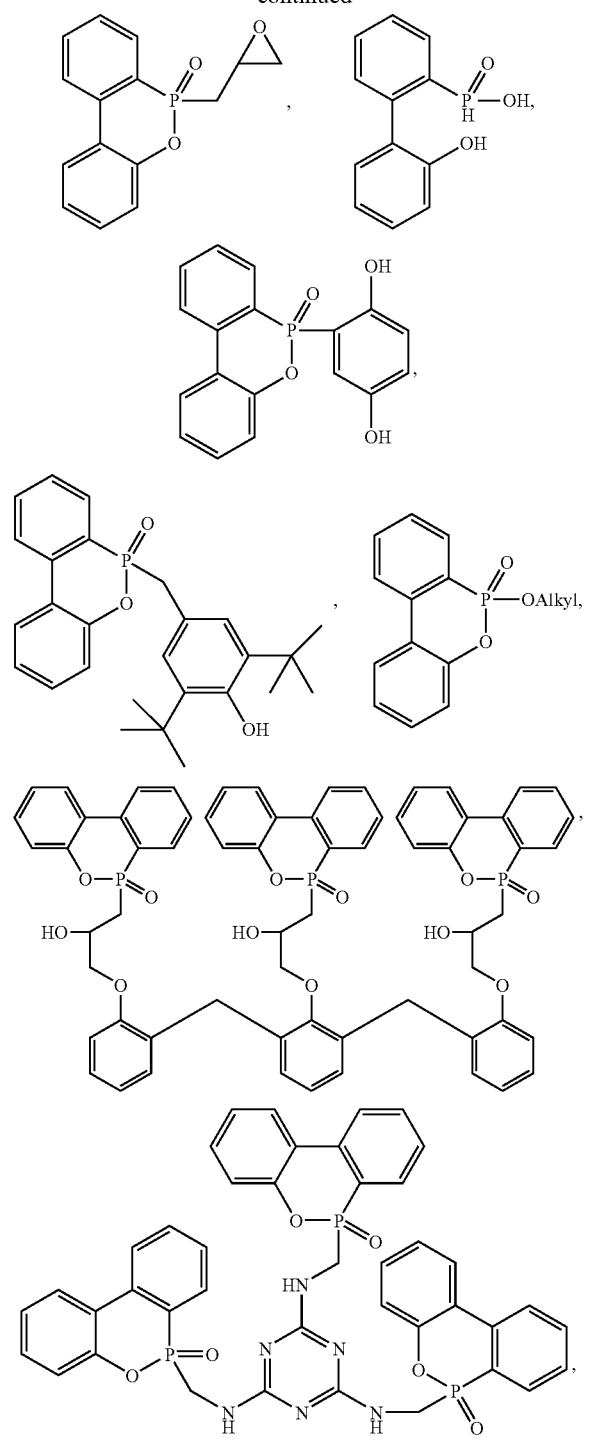
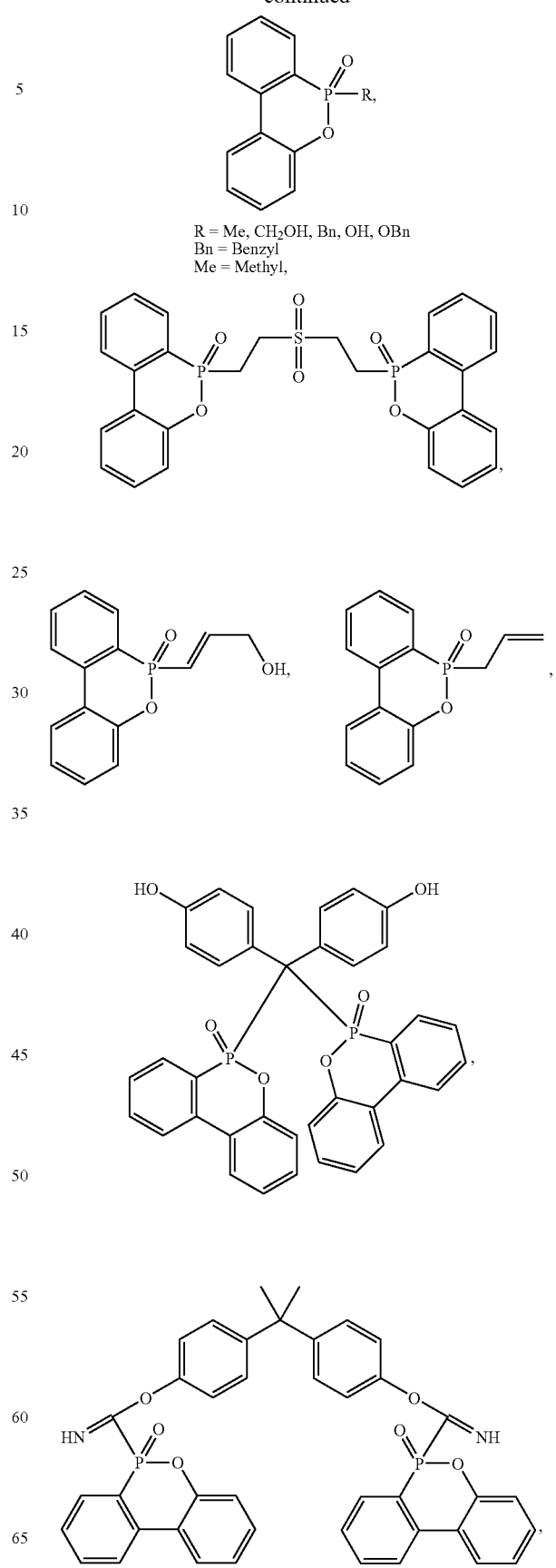
R = Me, CH₂OH, Bn, OH, OBn
Bn = Benzyl
Me = Methyl,

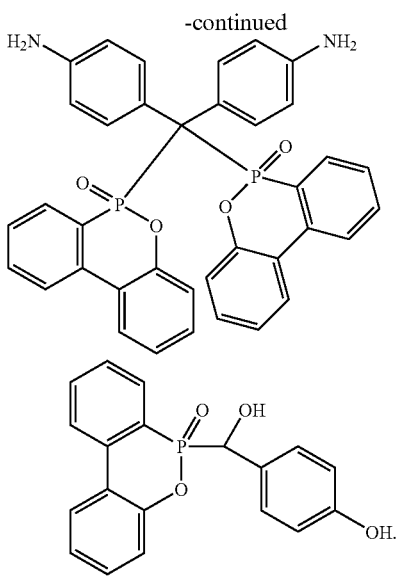

For example, phosphorus containing flame retardants are organic phosphate ester such as tetraphenyl resorcinol diphosphate, tetraphenyl bisphenol A diphosphate, tetraphenyl 4,4'-dihydroxybiphenyl diphosphate, triphenyl phosphate, resorcinol diphosphate oligomer (RDP), bisphenol A diphosphate oligomer (BBP), 4,4'-dihydroxybiphenyl diphosphate oligomer, resorcinol diphosphate oligomer (RDP), trioctylphosphate or tricresylphosphate.

Also examples of phosphorus containing flame retardants are: Tetrakis(hydroxymethyl)phosphonium sulphide, diethyl-N,N-bis(2-hydroxyethyl)-aminomethyl phosphonate, hydroxyalkyl esters of phosphorus acids, ammonium polyphosphate (APP) or phosphazene flame retardants and ethylenediamine diphosphate (EDAP).

For instance, the nitrogen containing flame retardants are melamine based flame retardants, isocyanurate flame retardants or sterically hindered alkoxy amine compounds.

The melamine based flame retardants are, for example, selected from the group consisting of melamine cyanurate, melamine borate, melamine phosphates, melamine polyphosphates, melamine pyrophosphates, melamine ammonium polyphosphates and melamine ammonium pyrophosphates.

For example, isocyanurate flame retardants are polyisocyanurate, esters of isocyanuric acid or isocyanurates. Representative examples are hydroxyalkyl isocyanurates, such as tris-(2-hydroxyethyl)isocyanurate, tris(hydroxymethyl) isocyanurate, tris(3-hydroxy-n-propyl)isocyanurate or triglycidyl isocyanurate.

Sterically hindered alkoxy amine compounds correspond, for example, to the formula (102)

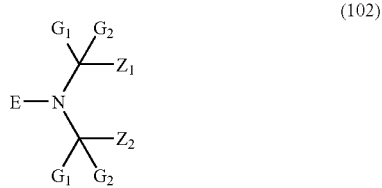

(102)

wherein $G_1$ and $G_2$ are each independently of the other $C_1$-$C_8$alkyl or together are pentamethylene or hexamethylene, each being preferably $C_1$-$C_4$alkyl, especially methyl, $Z_1$ and $Z_2$ are each methyl or $Z_1$ and $Z_2$ together are a bridging group, especially for completion of a 5- or 6-membered ring, preferably a piperidine ring, it being possible for the resulting N-heterocycle to be unsubstituted or substituted, for example by ester, ether, amide, amino, carboxy or urethane groups, E is alkoxy, alkenyloxy, cycloalkoxy, aralkoxy, aryloxy or O-T-(OH)$_b$, and T is $C_1$-$C_{18}$alkylene, $C_5$-$C_{18}$cycloalkylene, $C_5$-$C_{18}$cycloalkenylene, or $C_1$-$C_4$alkylene substituted by phenyl or by phenyl substituted by 1 or 2 $C_1$-$C_4$alkyl groups, and b is 1, 2 or 3, with b not being greater than the number of carbon atoms in T and, when b is 2 or 3, each hydroxyl group being bonded to a different carbon atom.

E is preferably $C_1$-$C_{18}$alkoxy, $C_5$-$C_6$cycloalkoxy, or $C_1$-$C_{18}$alkoxy substituted by from 1 to 3 OH groups.

Examples of sterically hindered alkoxyamines of formula (102) can be found in U.S. Pat. No. 4,983,737, U.S. Pat. No. 5,047,489 and U.S. Pat. No. 5,077,340, and also GB-A-2 373 507 (especially page 7, line 1 to page 31, line 1; page 48, line 10 to page 52, third line from the bottom) and WO-A-03/050175 (especially page 11, penultimate line to page 37, last line; page 54, line 9 to third last line; pages 61/62, compounds NOR1 to NOR12). The mentioned locations are to be considered as part of the present Application.

Representative halogenated flame retardants are, for example:

Polybrominated diphenyl oxide, decabromodiphenyl oxide, tris[3-bromo-2,2-bis(bromomethyl)propyl]phosphate, tris(2,3-dibromopropyl)phosphate, tris(2,3-dichloropropyl)phosphate, chlorendic acid, tetrachlorophthalic acid, tetrabromophthalic acid, poly-β-chloroethyl triphosphonate mixture, tetrabromobisphenol A bis(2,3-dibromopropyl ether), brominated epoxy resin, ethylene-bis(tetrabromophthalimide), bis(hexachlorocyclopentadieno)cyclooctane, chlorinated paraffins, octabromodiphenyl ether, hexa-chlorocyclopentadiene derivatives, 1,2-bis(tribromophenoxy) ethane, tetrabromo-bisphenol A, ethylene bis-(dibromo-norbornanedicarboximide), bis-(hexachlorocycloentadeno) cyclooctane, PTFE, tris-(2,3-dibromopropyl)-isocyanurate, and ethylene-bis-tetrabromophthalimide.

The flame retardant mentioned above are routinely combined with an inorganic oxide synergist. Most common for this use are zinc or antimony oxides, e.g. $Sb_2O_3$ or $Sb_2O_5$. Boron compounds are suitable, too.

Examples of inorganic flame retardants are metal hydroxide, metal oxide, aluminium compound flame retardant, boron compound, silicates, sulfates and carbonates, such as magnesium hydroxide, zinc oxide, molybdenum trioxide, $Sb_2O_5$, $Sb_2O_3$, silica, alumina trihydrate, alumina oxy hydroxide (Boehmite), zinc borate, calcium silicate, magnesium silicate, calcium sulfate and magnesium carbonate.

The above-mentioned further flame retardants are advantageously used in an amount from 0.5% to 45.0%, for instance from 1.0% to 25.0%, for example from 1.0% to 15.0%, especially from 3.0% to 15.0% by weight of the organic polymer.

For instance, the organic polymer is a synthetic organic polymer, especially a thermoplastic or thermoset, in particular a thermoplastic.

A particularly preferred organic polymer is a polyamide, a polyester or a polycarbonate, each optionally containing a reinforcing agent.

Examples of Organic Polymers are:

1. Polymers of mono- and di-olefins, for example polypropylene, polyisobutylene, poly-butene-1, poly-4-methylpentene-1, polyvinylcyclohexane, polyisoprene or polybutadiene and also polymerisates of cyclo-olefins, for example of cyclopentene or norbornene; and also polyethylene (which may optionally be crosslinked), for example high density polyethylene (HDPE), high density polyethylene of high molecular weight (HDPE-HMW), high density polyethylene of ultra-high molecular weight (HDPE-UHMW), medium density polyethylene (MDPE), low density polyethylene (LDPE), and linear low density polyethylene (LLDPE), (VLDPE) and (ULDPE).

Polyolefins, that is to say polymers of mono-olefins, as mentioned by way of example in the preceding paragraph, especially polyethylene and polypropylene, can be prepared by various processes, especially by the following methods:
a) by free radical polymerisation (usually at high pressure and high temperature);
b) by means of a catalyst, the catalyst usually containing one or more metals of group IVb, Vb, VIb or VIII. Those metals generally have one or more ligands, such as oxides, halides, alcoholates, esters, ethers, amines, alkyls, alkenyls and/or aryls, which may be either π- or σ-coordinated. Such metal complexes may be free or fixed to carriers, for example to activated magnesium chloride, titanium(III) chloride, aluminium oxide or silicon oxide. Such catalysts may be soluble or insoluble in the polymerisation medium. The catalysts can be active as such in the polymerisation or further activators may be used, for example metal alkyls, metal hydrides, metal alkyl halides, metal alkyl oxides or metal alkyl oxanes, the metals being elements of group(s) Ia, IIa and/or IIIa. The activators may have been modified, for example, with further ester, ether, amine or silyl ether groups. Such catalyst systems are usually referred to as Phillips, Standard Oil Indiana, Ziegler (-Natta), TNZ (DuPont), metallocene or Single Site Catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of mono- and di-olefins with one another or with other vinyl monomers, for example ethylene/propylene copolymers, linear low density polyethylene (LLDPE) and mixtures thereof with low density polyethylene (LDPE), propylene/butene-1 copolymers, propylene/isobutylene copolymers, ethylene/butene-1 copolymers, ethylene/hexene copolymers, ethylene/methylpentene copolymers, ethylene/heptene copolymers, ethylene/octene copolymers, ethylene/vinylcyclohexane copolymers, ethylene/cyclo-olefin copolymers, for example ethylene/norbornene (COC), ethylene/1-olefin copolymers wherein the 1-olefin is prepared in situ, propylene/butadiene copolymers, isobutylene/isoprene copolymers, ethylene/vinyl cyclohexene copolymers, ethylene/alkyl acrylate copolymers, ethylene/alkyl methacrylate copolymers, ethylene/vinyl acetate copolymers, ethylene/acrylic acid copolymers and salts thereof (ionomers), and also terpolymers of ethylene with propylene and a diene, such as hexadiene, dicyclopentadiene or ethylidenenorbornene; and also mixtures of such copolymers with one another or with polymers mentioned under 1), for example polypropylene-ethylene/propylene copolymers, LDPE-ethylene/vinyl acetate copolymers, LDPE-ethylene/acrylic acid copolymers, LLDPE-ethylene/vinyl acetate copolymers, LLDPE-ethylene/acrylic acid copolymers and alternately or randomly structured polyalkylene-carbon monoxide copolymers and mixtures thereof with other polymers, for example polyamides.

4. Polystyrene, poly(p-methylstyrene), poly(α-methylstyrene).

5. Aromatic homopolymers and copolymers derived from vinyl-aromatic monomers, for example styrene, α-methylstyrene, all isomers of vinyltoluene, for example p-vinyltoluene, all isomers of ethylstyrene, propylstyrene, vinylbiphenyl, vinylnaphthalene, vinylanthracene and mixtures thereof; homopolymers and copolymers can have a syndiotactic, isotactic, hemi-isotactic or atactic stereo structure; preference is given to atactic polymers. Also included are stereoblock polymers.

6a. Copolymers including the already mentioned vinyl-aromatic monomers and comonomers selected from ethylene, propylene, dienes, nitriles, acids, maleic anhydrides, maleic acid amides, vinyl acetate, acrylic acid derivatives and mixtures thereof, for example styrene/butadiene, styrene/acrylonitrile, styrene/ethylene (interpolymers), styrene/alkyl methacrylate, styrene/butadiene/alkyl acrylate and methacrylate, styrene/maleic anhydride, styrene/acrylonitrile/methyl acrylate; high-impact-strength mixtures consisting of styrene copolymers and another polymer, for example a polyacrylate, a diene polymer or an ethylene/propylene/diene terpolymer; and also block copolymers of styrene, for example styrene/butadiene/styrene, styrene/isoprene/styrene, styrene/ethylene-butylene/styrene or styrene/ethylene-propylene/styrene.

6b. Hydrogenated aromatic polymers prepared by hydrogenation of the polymers mentioned under 6.), especially polycyclohexylethylene (PCHE), often also referred to as polyvinylcyclohexane (PVCH), which is prepared by hydrogenation of atactic polystyrene.

6c. Hydrogenated aromatic polymers prepared by hydrogenation of the polymers mentioned under 6a.).

Homopolymers and copolymers can have a syndiotactic, isotactic, hemi-isotactic or atactic stereo structure; preference is given to atactic polymers. Also included are stereoblock polymers.

7. Graft copolymers of vinyl-aromatic monomers, for example styrene on polybutadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleic acid imide on polybutadiene; styrene and maleic acid imide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 6), such as those known, for example, as so-called ABS, MBS, ASA or AES polymers.

8. Polymers derived from α,β-unsaturated acids and derivatives thereof, such as poly-acrylates and polymethacrylates, or polymethyl methacrylates, polyacrylamides and poly-acrylonitriles impact-resistant-modified with butyl acrylate.

9. Copolymers of the monomers mentioned under 8) with one another or with other unsaturated monomers, for example acrylonitrile/butadiene copolymers, acrylonitrile/alkyl acrylate copolymers, acrylonitrile/alkoxyalkyl acrylate copolymers, acrylonitrile/vinyl halide copolymers or acrylonitrile/alkyl methacrylate/butadiene terpolymers.

10. Polymers derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and the copolymers thereof with olefins mentioned in Point 1.

11. Homo- and co-polymers of cyclic ethers, such as polyalkylene glycols, polyethylene oxide, polypropylene oxide or copolymers thereof with bisglycidyl ethers.

12. Polyacetals, such as polyoxymethylene, and also those polyoxymethylenes which contain comonomers, for example ethylene oxide; polyacetals modified with thermoplastic polyurethanes, acrylates or MBS.

13. Polyphenylene oxides and sulfides and mixtures thereof with styrene polymers or polyamides.

14. Polyamides and copolyamides derived from diamines and dicarboxylic acids and/or from aminocarboxylic acids or the corresponding lactams, such as polyamide 4, polyamide 6, polyamide 6/6, 6/10, 6/9, 6/12, 4/6, 12/12, polyamide 11, polyamide 12, aromatic polyamides derived from m-xylene, diamine and adipic acid; polyamide 6/I (polyhexamethylene isophthalimide, MXD (m-xylylenediamine); polyamides prepared from hexamethylenediamine and iso- and/or terephthalic acid and optionally an elastomer as modifier, for example poly-2,4,4-trimethylhexamethylene terephthalamide or poly-m-phenylene isophthalamide. Block copolymers of the above-mentioned polyamides with polyolefins, olefin copolymers, ionomers or chemically bonded or grafted elastomers; or with polyethers, for example with polyethylene glycol, polypropylene glycol or polytetramethylene glycol. Also polyamides or copolyamides modified with EPDM or ABS; and polyamides condensed during processing ("RIM polyamide systems").

Examples of polyamides and copolyamides that can be used are derived from, inter alia, ϵ-caprolactam, adipic acid, sebacic acid, dodecanoic acid, isophthalic acid, terephthalic acid, hexamethylenediamine, tetramethylenediamine, 2-methyl-pentamethylenediamine, 2,2,4-trimethylhexamethylenediamine, 2,4,4-trimethylhexamethylenediamine, m-xylylenediamine or bis(3-methyl-4-aminocyclohexyl)methane; and also semi-aromatic polyamides such as polyamide 66/6I, for example consisting of 70-95% polyamide 6/6 and 5-30% polyamide 6/I; and also tricopolymers in which some of the polyamide 6/6 has been replaced, for example consisting of 60-89% polyamide 6/6, 5-30% polyamide 6/I and 1-10% of another aliphatic polyamide; the latter may consist of, for example, polyamide 6, polyamide 11, polyamide 12 or polyamide 6/12 units. Such tricopolymers may accordingly be designated polyamide 6616116, polyamide 66/6I/11, polyamide 66/6I/12, polyamide 66/6I/610 or polyamide 66/6I/612.

15. Polyureas, polyimides, polyamide imides, polyether imides, polyester imides, polyhydantoins and polybenzimidazoles.

16. Polyesters derived from dicarboxylic acids and dialcohols and/or from hydroxycarboxylic acids or the corresponding lactones, such as polyethylene terephthalate, polypropylene terephthalate, polybutylene terephthalate, poly-1,4-dimethylolcyclohexane terephthalate, polyalkylene naphthalate (PAN) and polyhydroxybenzoates, and also block polyether esters derived from polyethers with hydroxyl terminal groups; and also polyesters modified with polycarbonates or MBS.

17. Polycarbonates and polyester carbonates.

18. Mixtures (polyblends) of the afore-mentioned polymers, for example PP/EPDM, polyamide/EPDM or ABS, PC/ABS, PBTP/ABS, PC/ASA, PC/PBT, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

19. Unsaturated polyester resins, for example solutions, in copolymerizable monomers, preferably styrene or methyl methacrylate, of polycondensation products made from saturated and unsaturated dicarboxylic acids, or from anhydrides of these, together with diols. Unsaturated polyester resins can be cured by free-radical polymerization using initiators (e.g. peroxides) and accelerators. The double bonds in the polyester chain can react with the double bond in the copolymerizable solvent monomer. The most important dicarboxylic acids for preparing the polyesters are maleic anhydride, fumaric acid and terephthalic acid. The diol most frequently used is 1,2-propanediol. Use is also made of ethylene glycol, diethylene glycol and neopentyl glycol, inter alia. The most suitable crosslinking monomer is styrene. Styrene is fully miscible with the resins and copolymerizes readily. The styrene content in unsaturated polyester resins is normally from 25 to 40%. A monomer which can be used instead of styrene is methyl methacrylate.

20. Epoxy resins, for example prepared by a polyaddition reaction of an epoxy resin component with a crosslinking (hardener) component. The epoxy resin components used are aromatic polyglycidyl esters, such as bisphenol A diglycidyl ester, bisphenol F diglycidyl ester or polyglycidyl esters of phenol-formaldehyde resins or cresolformaldehyde resins, or polyglycidyl esters of phthalic, isophthalic or terephthalic acid, or else of trimellitic acid, N-glycidyl compounds of aromatic amines or of heterocyclic nitrogen bases, or else di- or polyglycidyl compounds of polyhydric aliphatic alcohols. Hardeners which can be used are polyamines, such as triethylenetetramine, aminoethylpiperazine or isophoronediamine, polyamidoamines, polybasic acids or anhydrides of these, e.g. phthalic anhydride, hexahydrophthalic anhydride or methyltetrahydrophthalic anhydride, or phenols. The crosslinking may also take place via polymerization using suitable catalysts.

21. Polyurethane, that may be obtained by reacting polyethers, polyesters and poly-butadienes which contain terminal hydroxyl groups, i.e. polyols, with aliphatic or aromatic polyisocyanates.

Of interest is an organic polymer that is not a halogen-containing polymer. A halogen-containing polymer is any polymer containing one or more halogen groups such as F, Cl, Br, I.

Of interest is a synthetic organic polymer that is a polyolefin and copolymers thereof such as mentioned under items 1, 2 and 3, a polyurethane such as mentioned under item 24, a polyamid or a copolyamide such as mentioned under item 15 or that is a polyester such as mentioned under item 17. Preference is given to a polyamid, a copolymamid or a polyester, especially a polyamid or a polyester, for instance a polyamid, for example a polyester.

Preferably, the compound of formula (I)-(XII) is used in an amount from 0.1% to 25.0%, in particular from 0.4% to 15.0%, especially from 0.4% to 10.0%, in particular from 1.0% to 15.0% based on the weight of the organic polymer.

Also of interest is a process for flame retarding an organic polymer by applying thereto or incorporating therein a compound of formula (I)-(XII) in combination with at least one further additive.

Examples of Further Additives are:
1. Antioxidants
1.1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear nonylphenols or nonylphenols branched in the side-chain, e.g. 2,6-dinonyl-4-methylphenol, 2,4-dimethyl-6-(1'-methylundec- 1'-yl)-phenol, 2,4-dimethyl-6-(1'-methylheptadec-1'-yl)-phenol, 2,4-dimethyl-6-(1'-methyltridec-1'-yl)-phenol and mixtures thereof.

1.2. Alkylthiomethylphenols, for example 2,4-dioctylthiomethyl-6-tert-butylphenol, 2,4-dioctyl-thiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octa-decyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidene bisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-(α-methyl-benzyl)-4-nonylphenol], 2,2'-methylenebis[6-(α,α-dimethyl benzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxy-benzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methylphenyl)-dicyclopentadiene, bis[2-(3'-tert-butyl-2'-hydroxy-5'-methylbenzyl)-6-tert-butyl-4-methyl-phenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecyl-mercaptobutane, 1,1,5,5-tetra (5-tert-butyl-4-hydroxy-2-methylphenyl)pentane.

1.7. O-, N- and S-benzyl compounds, for example 3,5,3', 5'-tetra-tert-butyl-4,4'-dihydroxy-dibenzyl ether, octadecyl-4-hydroxy-3,5-dimethyl benzyl mercaptoacetate, tridecyl-4-hydroxy-3,5-di-tert-butylbenzyl mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzyl mercaptoacetate.

1.8. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di[4-(1,1,3,3-tetramethylbutyl) phenyl]2,2-bis(3,5-di-tert-butyl-4-hydroxybenzyl)malonate.

1.9. Hydroxybenzyl aromatic compounds, for example 1,3,5-tris(3,5-di-tert-butyl-4-hydroxy-benzyl)-2,4,6-trimethyl benzene, 1,4-bis(3,5-di-tert-butyl-4-hydroxybenzyl)-2, 3,5,6-tetra-methylbenzene, 2,4,6-tris(3,5-di-tert-butyl-4-hydroxybenzyl)phenol.

1.10. Triazine compounds, for example 2,4-bisoctylmercapto-6-(3,5-di-tert-butyl-4-hydroxy-anilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxy-benzyl)isocyanurate, 1,3,5-tris(4-tert-butyl-3-hydroxy-2,6-dimethylbenzyl)isocyanurate, 2,4, 6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxy-benzyl)isocyanurate.

1.11. Benzylphosphonates, for example dimethyl 2,5-di-tert-butyl-4-hydroxybenzyl-phosphonate, diethyl 3,5-di-tert-butyl-4-hydroxybenzyl phosphonate, dioctadecyl 3,5-di-tert-butyl-4-hydroxybenzylphosphonate, dioctadecyl 5-tert-butyl-4-hydroxy-3-methylbenzyl-phosphonate, calcium salt of 3,5-di-tert-butyl-4-hydroxybenzyl-phosphonic acid monoethyl ester.

1.12. Acylaminophenols, for example 4-hydroxylauric acid anilide, 4-hydroxystearic acid anilide, N-(3,5-di-tert-butyl-4-hydroxyphenyl)carbamic acid octyl ester.

1.13. Esters of β-(3,5-di-tert-butyl-4-hydroxyphenyl)propionic acid with mono- or poly-hydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalic acid diamide, 3-thiaundecanol, 3-thiapentadecanol, trimethyl-hexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or poly-hydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl)propionic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenylacetic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxalic acid diamide, 3-thiaundecanol, 3-thiapentadecanol, trimethyl-hexanediol, trimethylolpropane, 4-hydroxymethyl-1-phospha-2,6,7-trioxabicyclo [2.2.2]octane.

1.17. Amides of β-(3,5-di-tert-butyl-4-hydroxyphenyl) propionic acid, for example N,N'-bis(3,5-di-tert-butyl-4-hydroxyphenylpropionyl)hexamethylenediamide, N,N'-bis(3, 5-di-tert-butyl-4-hydroxyphenylpropionyl) trimethylenediamide, N,N'-bis(3,5-di-tert-butyl-4-hydroxyphenyl-propionyl)hydrazide, N,N'-bis[2-(3-[3,5-di-tert-butyl-4-hydroxyphenyl]-propionyloxy)ethyl]-oxamide (Naugard® XL-1 from Uniroyal).

1.18. Ascorbic acid (Vitamin C).

1.19. Amine-type antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di(2-naphthyl)-p-phenylenediamine, N-isopropyl-N'-phenyl-p-phenylenediamine, N-(1,3-dimethyl-butyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)-diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthyl-amine, N-phenyl-2-naphthylamine, octylated diphenylamine, for example p,p'-di-tert-octyl-diphenylamine, 4-n-butylaminophenol, 4-butyrylaminophenol, 4-nonanoylaminophenol, 4-dodecanoylaminophenol, 4-octadecanoylaminophenol, di(4-methoxyphenyl)amine, 2,6-di-tert-butyl-4-dimethylaminomethylphenol, 2,4'-diaminodiphenylmethane, 4,4'-diamino-diphenylmethane, N,N,N',N'-tetramethyl-4,4'-diaminodiphenylmethane, 1,2-di[(2-methyl-phenyl)amino]ethane, 1,2-di(phenylamino)propane, (o-tolyl)-biguanide, di[4-(1', 3'-dimethyl-butyl)phenyl]amine, tert-octylated N-phenyl-1-naphthylamine, mixture of mono- and di-alkylated tert-butyl-/tert-octyl-diphenylamines, mixture of mono- and di-alkylated nonyl-diphenylamines, mixture of mono- and di-alkylated dodecyldiphenylamines, mixture of mono- and di-alkylated isopropyl-/isohexyl-diphenylamines, mixtures of mono- and di-alkylated tert-butyldiphenylamines, 2,3-dihydro-3,3-dimethyl-4H-1,4-benzothiazine, phenothiazine, mixture of mono- and di-alkylated tert-butyl-/tert-octyl-phenothiazines, mixture of mono- and di-alkylated tert-octylphenothiazines, N-allylphenothiazine, N,N,N',N'-tetraphenyl-1,4-diaminobut-2-ene, N,N-bis(2,2,6,6-tetramethylpiperid-4-yl)-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)-benzotriazoles, for example 2-(2'-hydroxy-5'-methylphenyl)-benzotriazole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,3,3-tetramethylbutyl)-phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)-benzotriazole, 2-(2'-hydroxy-4'-octyloxyphenyl)-benzotriazole, 2-(3', 5'-di-tert-amyl-2'-hydroxyphenyl)-benzotriazole, 2-(3',5'-bis(α,α-dimethyl benzyl)-2'-hydroxyphenyl)-benzotriazole, 2-(3'-tert-butyl-2'-hydroxy-5'-(2-octyloxycarbonylethyl) phenyl)-5-chlorobenzotriazole, 2-(3'-tert-butyl-5'-[2-(2-ethyl hexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)-benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyl-oxy)carbonylethyl]-2'-hydroxyphenyl)-benzotriazole, 2-(3'-dodecyl-2'-hydroxy-5'-methyl-phenyl)-benzotriazole, 2-(3'-tert-butyl-2'-hydroxy-5'-(2-isooctyloxycarbonylethyl)-phenyl-benzotriazole, 2,2'-methylenebis[4-(1,1,3,3-tetramethylbutyl)-6-benzotriazol-2-yl-phenol]; transesterification product of 2-[3'-tert-butyl-5'-(2-methoxycarbonylethyl)-2'-hydroxyphenyl]-benzotriazole with polyethylene glycol 300;

[R—CH$_2$CH$_2$—COO—CH$_2$CH$_2$—]$_2$ wherein R=3'-tert-butyl-4'-hydroxy-5'-2H-benzotriazol-2-yl-phenyl; 2-[2'-hydroxy-3'-(α,α-dimethylbenzyl)-5'-(1,1,3,3-tetramethylbutyl)-phenyl]-benzotriazole; 2-[2'-hydroxy-3'-(1, 1,3,3-tetramethylbutyl)-5'-(α,α-dimethyl benzyl)-phenyl]-benzotriazole.

2.2. 2-Hydroxybenzophenones, for example the 4-hydroxy, 4-methoxy, 4-octyloxy, 4-decyl-oxy, 4-dodecyloxy, 4-benzyloxy, 4,2',4'-trihydroxy or 2'-hydroxy-4,4'-dimethoxy derivative.

2.3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

2.4. Acrylates, for example α-cyano-β,β-diphenylacrylic acid ethyl ester or isooctyl ester, α-methoxycarbonylcinnamic acid methyl ester, α-cyano-β-methyl-p-methoxycinnamic acid methyl ester or butyl ester, α-methoxycarbonyl-p-methoxycinnamic acid methyl ester, N-(β-methoxycarbonyl-β-cyanovinyl)-2-methyl-indoline.

2.5. Nickel compounds, for example nickel complexes of 2,2'-thio-bis[4-(1,1,3,3-tetra-methylbutyl)phenol], such as the 1:1 or 1:2 complex, optionally with additional ligands, such as n-butylamine, triethanolamine or N-cyclohexyldiethanolamine, nickel dibutyl dithiocarbamate, nickel salts of 4-hydroxy-3,5-di-tert-butylbenzylphosphonic acid monoalkyl esters, such as of the methyl or ethyl ester, nickel complexes of ketoximes, such as of 2-hydroxy-4-methylphenylundecyl ketoxime, nickel complexes of 1-phenyl-4-lauroyl-5-hydroxypyrazole, optionally with additional ligands.

2.6. Sterically hindered amines, for example bis(2,2,6,6-tetramethylpiperid-4-yl)sebacate, bis(2,2,6,6-tetramethylpiperid-4-yl)succinate, bis(1,2,2,6,6-pentamethylpiperid-4-yl) sebacate, bis(1-octyloxy-2,2,6,6-tetramethylpiperid-4-yl) sebacate, n-butyl-3,5-di-tert-butyl-4-hydroxybenzylmalonic acid bis(1,2,2,6,6-pentamethylpiperidyl)ester, condensation product of 1-hydroxyethyl-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3, 5-s-triazine, tris(2,2,6,6-tetramethyl-4-piperidyl)nitrilotriacetate, tetrakis(2,2,6,6-tetramethyl-4-piperidyl)-1,2,3,4-butanetetraoate, 1,1'-(1,2-ethanediyl)bis(3,3,5,5-tetramethyl piperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensation products of N,N'-bis(2,2,6,6-tetramethyl-4-piperidyl)hexamethylenediamine and 4-morpholino-2,6-dichloro-1,3,5-triazine, condensation product of 2-chloro-4,6-di(4-n-butylamino-2,2,6,6-tetramethylpiperidyl)-1,3,5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis(3-aminopropyl-amino) ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-

(1,2,2,6,6-pentamethyl-4-piperidyl)pyrrolidine-2,5-dione, mixture of 4-hexadecyloxy- and 4-stearyloxy-2,2,6,6-tetramethylpiperidine, condensation product of N,N'-bis(2,2,6,6-tetramethyl-4-piperidyl)hexamethylenediamine and 4-cyclohexylamino-2,6-dichloro-1,3,5-triazine, condensation product of 1,2-bis(3-aminopropylamino)ethane and 2,4,6-trichloro-1,3,5-triazine and 4-butylamino-2,2,6,6-tetramethylpiperidine (CAS Reg. No. [136504-96-6]); condensation product of 1,6-diaminohexane and 2,4,6-trichloro-1,3,5-triazine and also N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4.5]decane, reaction product of 7,7,9,9-tetramethyl-2-cycloundecyl-1-oxa-3,8-diaza-4-oxospiro-[4.5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic anhydride α-olefin copolymer and 2,2,6,6-tetramethyl-4-aminopiperidine or 1,2,2,6,6-pentamethyl-4-aminopiperidine.

2.7. Oxalic acid diamides, for example 4, 4'-dioctyloxy oxanilide, 2,2'-diethoxy oxanilide, 2,2'-dioctyloxy-5,5'-di-tert-butyl oxanilide, 2,2'-didodecyloxy-5,5'-di-tert-butyl oxanilide, 2-ethoxy-2'-ethyl oxanilide, N,N'-bis(3-dimethylaminopropyl)oxalamide, 2-ethoxy-5-tert-butyl-2'-ethyl oxanilide and a mixture thereof with 2-ethoxy-2'-ethyl-5,4'-di-tert-butyl oxanilide, mixtures of o- and p-methoxy- and also of o- and p-ethoxy-di-substituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-(2-hydroxy-4-(2-hydroxy-3-octyloxypropyloxy)phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxalic acid diamide, N-salicylal-N'-salicyloyl-hydrazine, N,N'-bis(salicyloyl)hydrazine, N,N'-bis(3,5-di-tert-butyl-4-hydroxyphenylpropionyl)-hydrazine, 3-salicyloylamino-1,2,4-triazole, bis(benzylidene)oxalic acid dihydrazide, oxanilide, isophthalic acid dihydrazide, sebacic acid bis-phenylhydrazide, N,N'-diacetyladipic acid dihydrazide, N,N'-bis-salicyloyloxalic acid dihydrazide, N,N'-bis-salicyloylthiopropionic acid dihydrazide.

4. Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearyl-pentaerythritol diphosphite, tris(2,4-di-tert-butylphenyl)phosphite, diisodecylpentaerythritol diphosphite, bis(2,4-di-tert-butylphenyl)pentaerythritol diphosphite, bis(2,4-dicumylphenyl)-pentaerythritol diphosphite, bis(2,6-di-tert-butyl-4-methylphenyl)-pentaerythritol diphosphite, bis-isodecyloxy-pentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphospho-cine, bis(2,4-di-tert-butyl-6-methylphenyl)methylphosphite, bis(2,4-di-tert-butyl-6-methyl-phenyl)ethylphosphite, 6-fluoro-2,4,8,10-tetra-tert-butyl-12-methyl-dibenzo[d,g]-1,3,2-dioxa-phosphocine, 2,2',2''-nitrilo[triethyl-tris(3,3',5,5'-tetra-tert-butyl-1,1'-biphenyl-2,2'-diyl)-phosphite], 2-ethylhexyl-(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine from hydrogenated tallow fatty amines.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-octadecyl-alpha-pentadecylnitrone, N-heptadecyl-alpha-hepta-decynitrone, N-octadecyl-alpha-hexadecylnitrone, nitrones derived from N,N-dialkyl-hydroxylamines prepared from hydrogenated tallow fatty amines.

7. Thiosynergistic compounds, for example thiodipropionic acid dilauryl ester or thiodipropionic acid distearyl ester.

8. Peroxide-destroying compounds, for example esters of β-thiodipropionic acid, for example the lauryl, stearyl, myristyl or tridecyl ester, mercaptobenzimidazole, the zinc salt of 2-mercaptobenzimidazole, zinc dibutyldithiocarbamate, dioctadecyldisulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony pyrocatecholate or zinc pyrocatecholate.

11. Nucleating agents, for example inorganic substances, e.g. talc, metal oxides, such as titanium dioxide or magnesium oxide, phosphates, carbonates or sulfates of preferably alkaline earth metals; organic compounds, such as mono- or poly-carboxylic acids and their salts, e.g. 4-tert-butylbenzoic acid, adipic acid, diphenylacetic acid, sodium succinate or sodium benzoate; polymeric compounds, for example ionic copolymerisates ("ionomers"). Special preference is given to 1,3:2,4-bis(3',4'-dimethylbenzylidene)sorbitol, 1,3:2,4-di(paramethyldibenzylidene)sorbitol and 1,3:2,4-di(benzylidene)sorbitol.

12. Fillers and reinforcing agents, for example calcium carbonate, silicates, glass fibres, glass beads, talc, kaolin, mica, barium sulfate, metal oxides and hydroxides, carbon black, graphite, wood powders, and powders and fibres of other natural products, synthetic fibres.

13. Other additives, for example plasticisers, lubricants, emulsifiers, pigments, rheology additives, catalysts, flow improvers, optical brighteners, antistatics, blowing agents.

14. Benzofuranones and indolinones, for example as described in U.S. Pat. No. 4,325,863; U.S. Pat. No. 4,338,244; U.S. Pat. No. 5,175,312, U.S. Pat. No. 5,216,052; U.S. Pat. No. 5,252,643; DE-A-4 316 611; DE-A-4 316 622; DE-A-4 316 876; EP-A-0 589 839 or EP-A-0 591 102, or 3-[4-(2-acetoxyethoxy)phenyl]-5,7-di-tert-butyl-benzofuran-2-one, 5,7-di-tert-butyl-3-[4-(2-stearoyl-oxyethoxy)phenyl]benzofuran-2-one, 3,3'-bis[5,7-di-tert-butyl-3-(4-[2-hydroxyethoxy]phenyl)-benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxy-phenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

The further additives are added, for example, in concentrations of from 0.01% to 10%, especially from 0.2% to 5%, based on the weight of the organic polymer. For fillers and reinforcing agents other concentrations might apply as described below.

For instance, the further additive is selected from the group consisting of antioxidants, UV absorbers, light stabilisers, metal deactivators, phosphites, phosphonites, hydroxylamines, nitrones, thiosynergistic compounds, peroxide-destroying compounds, polyamide stabilisers, basic co-stabilisers, nucleating agents, fillers, reinforcing agents, plasticisers, lubricants, emulsifiers, pigments, rheology additives, catalysts, flow improvers, optical brighteners, antistatics, blowing agents, benzofuranones and indolinones.

For example, the further additive is selected from the group consisting of fillers and reinforcing agents, especially glass-based and mineral based fillers. The filler or reinforcing agent may be used in an amount of from 5% to 60%, especially from 10% to 40%, based on the weight of the organic polymer.

Incorporation into the organic polymers can be effected, for example, by mixing therein or applying thereto a compound of formula (I)-(XII) and, if desired, further flame retardants and/or further additives by the methods which are customary in the art. The incorporation can take place prior to or during the shaping operation, or by applying the dissolved or dispersed compound to the polymer, with or without subsequent evaporation of the solvent. In the case of elastomers, these can also be stabilized as lattices. A further possibility for incorporating the compounds mentioned above into polymers is to add them before, during or directly after the polymerization of the corresponding monomers or prior to crosslinking. In this context the compounds mentioned above can be added as it is or else in encapsulated form (for example in waxes, oils or polymers).

The compounds mentioned herein can also be added in the form of a masterbatch containing said compounds in a concentration, for example, of from 2.5% to 25% based on the weight of the organic polymer.

The compounds mentioned herein can judiciously be incorporated by the following methods:
- as emulsion or dispersion (e.g. to lattices or emulsion polymers),
- as a dry mixture during the mixing in of additional components or polymer mixtures,
- by direct introduction into the processing apparatus (e.g. extruders, internal mixers, etc),
- as solution or melt.

Such compositions can be employed in various forms and/or processed to give various products, for example as (to give) laminates, printed circuit boards, films, fibres, tapes, moulding compositions, profiles, or as binders for coating materials, adhesives, or putties. Such processes can be extrusion, injection molding, fiber spinning or compression.

Of interest is the use of a compound of formula (I)-(XII) as defined above as flame retardant, in particular in an organic polymer.

All the preferences outlined above also apply to this use.

Percentages are weight-% unless otherwise stated.

The following examples illustrate the invention but are not to be construed to limit the scope of this invention in any manner.

EXAMPLES

Components Used

Polybutylene terephthalate (PBT): Crastin® S600 F10, Du Pont de Nemours GmbH, Germany
Polyamide (PA6): Durethan® B40E, Lanxess, Germany
Glass fibers: Chop Vantage® 3786 (cut length=4.5 mm, fiber diameter=10 μm), PPG Industries, Inc.
Phosphorous synergist (Al-salt of diethylphosphinic acid): Exolit® OP 1230 or Exolit® OP 930, Clariant GmbH, Germany

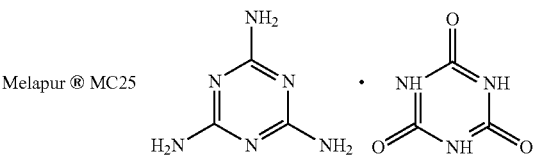

Melapur® MC25

Al-hypophosphite (Al-phosphinate), Anan Drug & Chemicals, India
Test Methods to Assess Flame Retardancy
UL 94 Test for "Flammability of Plastic Materials for Parts in Devices and Appliances", 5$^{th}$ edition, Oct. 29, 1996. Ratings according to the UL 94 V test are compiled in the following table (times are indicated for one specimen):

| Rating | Afterflame time | Burning drips | Burn to clamp |
|---|---|---|---|
| V-0 | <10 s | No | No |
| V-1 | <30 s | No | No |
| V-2 | <30 s | Yes | No |
| Fail (n.c.) | <30 s |  | Yes |
| Fail (n.c) | >30 s |  | No |

Standard Procedure

The flame retardant additives listed in Tables 1 and 2 are dry-mixed and are dried in vacuo for at least 12 hours at 90° C. The mixtures obtained are melt compounded in a co-rotating Coperion®ZSK 25 WLE, twin screw extruder with two lateral feeders and exhaust unit.

Processing programme PBT: zones 1-11=60, 225, 265, 260→260, 255° C., vacuum<50 mbar, speed of rotation=150 rpm, throughput=8 kg/h.

Processing programme PA6: zones 1-11=60, 230, 240, 245, 250→250° C., vacuum<200 mbar, speed of rotation=200 rpm, throughput=8 kg/h.

The flame retardant components are incorporated into the polymer melt via lateral feed unit, the glass fibers are added via a second lateral feed unit. The homogenized polymer strand is drawn off, cooled in a waterbath and then pelletized.

After adequate drying of the pellets (vacuo, 12 hours at 90° C.) the formulations are processed at melt temperatures of 240-275° C. in an injection molding machine (Arburg® 370S Allrounder) to give test specimens (UL test bar, 1.6 mm thickness).

After conditioning for 24 hours at 25° C. and 50% relative humidity the test specimens are tested and classified on the basis of the UL 94-V (Underwriter Laboratories) test.

Unless stated otherwise, all experiments of each series are carried out under identical conditions for comparability (e.g. temperature profiles, screw geometries, addition of flame retardant additives, injection-molding parameters, etc.). All of the amounts are stated as % by weight and are based on the plastics molding composition including the flame retardant (s) and reinforcing additives.

TABLE 1

Glass fiber reinforced PBT formulations

| Example | FR Additives | Glass fiber content | UL 94 rating (1.6 mm) | Burn times after 1$^{st}$/2$^{nd}$ ignition, 5 specimens [s] |
|---|---|---|---|---|
| Comparison 1 | — | 30% | n.c. | 640 |
| 1 | 10% Exolit ® OP 1230 5% 6-aminouracil | 30% | V-0 | 10/26 |
| 2 | 12.5% Exolit ® OP 1230 2.5% 6-aminouracil | 30% | V-0 | 7/24 |
| 3 | 13.3% Exolit ® OP 1230 6.7% 6-aminouracil | 30% | V-0 | 15/24 |
| 4 | 12.5% Al-hypophosphite 2.5% 6-aminouracil | 30% | V-0 | 4/9 |
| 5 | 12.5% Exolit ® OP 930 2.5% 5-aminouracil | 30% | V-0 | 8/29 |

TABLE 2

Unreinforced PA6 formulations

| Example | FR Additives | UL 94 rating (1.6 mm) | Burn times after 1$^{st}$/2$^{nd}$ ignition, 5 specimens [s] |
|---|---|---|---|
| Comparison 2 | — | n.c. | 165/790 |
| 4 | 5% 6-aminouracil | V-0 | 5/10 |
| 5 | 5% 6-amino-1-methyluracil | V-0 | 6/11 |
| 6 | 5% 6-amino-1,3-dimethyluracil | V-2 | 8/13 |
| 7 | 3.5% Melapur ® MC25 0.5% 6-aminouracil | V-2 | 11/22 |
| 8 | 5% 5-aminouracil | V-0 | 0/0 |
| 9 | 5% 2,6-diamino-4-pyrimidinone | V-2 | 16/26 |
| 10 | 5% 4-hydroxy-2,5,6-triamino-pyrimidine sulfate | V-0 | 6/10 |

From the above mentioned results it can be seen that the formulations according to the present invention provide polymers with excellent flame retardant and self-extinguishing properties.

The invention claimed is:

1. A composition comprising
   a) a polyester polymer,
   b) a compound of formula (I)-(X) and
   c) a further flame retardant selected from salts of an organic phosphinic acid,

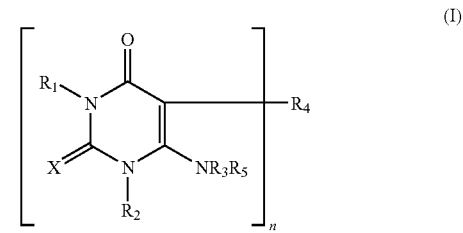

(I)

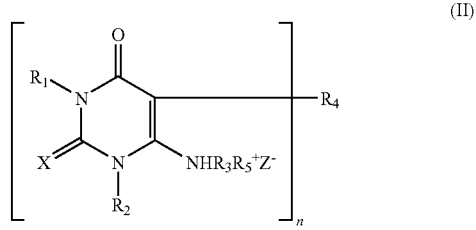

(II)

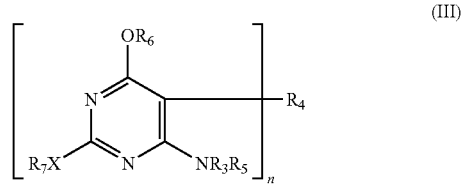

(III)

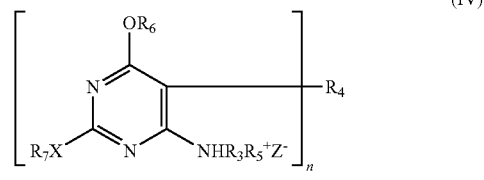

(IV)

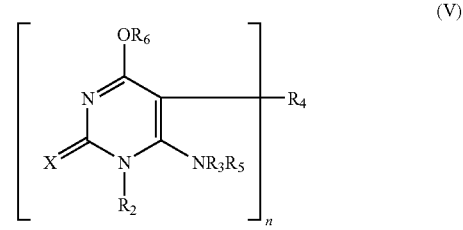

(V)

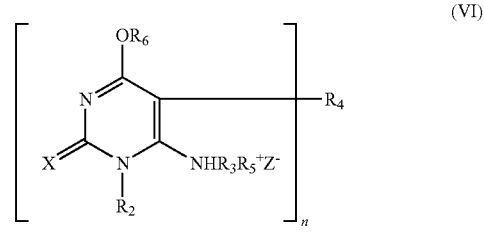

(VI)

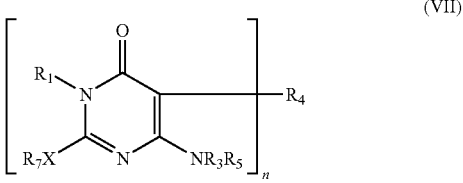

(VII)

-continued

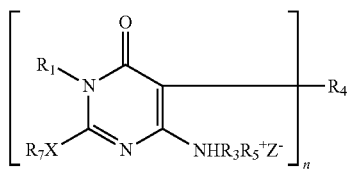
(VIII)

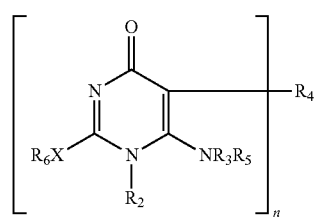
(IX)

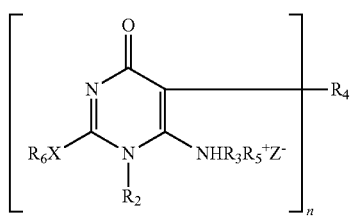
(X)

wherein
n is 1 or 2,
X is O, S or NH,
$Z^-$ is an anion of an inorganic acid,
$R_1$ and $R_2$ are independently of each other H, glycidyl, COO—$R_8$, OCO—$R_9$, CO—$R_9$, CO—$NR_8R_{10}$ or an unsubstituted or substituted radical selected from the group consisting of $C_1$-$C_{18}$alkyl, $C_3$-$C_{18}$alkenyl, $C_3$-$C_6$alkynyl, $C_5$-$C_8$cycloalkyl, $C_5$-$C_8$cycloalkenyl, $C_6$-$C_{12}$aryl, $C_7$-$C_{14}$aralkyl, $C_8$-$C_{12}$aralkenyl, $C_8$-$C_{12}$aralkynyl, $C_1$-$C_{18}$alkoxy, $C_3$-$C_{18}$alkenyloxy, $C_3$-$C_6$alkynyloxy, $C_6$-$C_{12}$aryloxy and $C_7$-$C_{14}$aralkoxy,
$R_3$ and $R_5$ are independently of each other as defined for $R_1$, in case n is 1,
$R_4$ is halogen, NO, CN, $NR_3R_5$, $NHR_3R_5^+Z^-$, furanonyl or as defined for $R_1$,
in case n is 2,
$R_4$ is an unsubstituted or substituted biradical selected from the group consisting of $C_1$-$C_{18}$alkylene and $C_7$-$C_{14}$aralkylene,
$R_6$ is as defined for $R_1$,
$R_7$ is as defined for $R_2$,
$R_8$ and $R_{10}$ are independently of each other H or as defined for $R_9$;
$R_9$ is an unsubstituted or substituted radical selected from the group consisting of $C_1$-$C_{18}$alkyl, $C_3$-$C_{18}$alkenyl, $C_3$-$C_6$alkynyl, $C_5$-$C_8$cycloalkyl, $C_5$-$C_8$cycloalkenyl, $C_6$-$C_{12}$aryl, $C_7$-$C_{14}$aralkyl, $C_8$-$C_{12}$aralkenyl and $C_8$-$C_{12}$aralkynyl,
the substituted alkylene, aralkylene, alkyl, alkenyl, alkynyl, cycloalkyl, cycloalkenyl, aryl, aralkyl, aralkenyl, aralkynyl, alkoxy, alkenyloxy, alkynyloxy, aryloxy and aralkoxy are substituted by one or more radicals selected from the group consisting of halogen, hydroxy, nitro, cyano, COO—$R_{13}$, $CONR_{13}R_{14}$, OCO—$R_{15}$, $NR_{13}CO$—$R_{15}$, $NR_{13}R_{14}$, CO—$R_{15}$ and O—$R_{15}$,
or the substituted aralkylene, aryl, aralkyl, aralkenyl, aralkynyl, aryloxy and aralkoxy are substituted at the aryl by one or more radicals selected from the group consisting of $C_1$-$C_{18}$alkyl, $C_3$-$C_{18}$alkenyl and $C_3$-$C_6$alkynyl, $R_{13}$ and $R_{14}$ are independently of each other H or as defined for $R_{15}$ and
$R_{15}$ is $C_1$-$C_{18}$alkyl, $C_3$-$C_{18}$alkenyl, $C_3$-$C_6$alkynyl, $C_5$-$C_8$cycloalkyl, $C_5$-$C_8$cycloalkenyl, $C_6$-$C_{12}$aryl, $C_7$-$C_{14}$aralkyl, $C_8$-$C_{12}$aralkenyl or $C_8$-$C_{12}$aralkynyl.

2. A composition according to claim 1, wherein the compound of formula (I)-(X) is present in an amount from 0.1% to 25.0% and the further flame retardant is present in an amount from 0.5% to 45.0%, based on the weight of the polyester polymer.

3. A composition according to claim 1, wherein component b) is 6-aminouracil, 6-amino-1,3-dimethyluracil or a phosphoric acid salt of 6-aminouracil.

4. A composition according to claim 1, wherein component b) is 6-aminouracil and the further flame retardant is the aluminum salt of diethylphosphinic acid.

5. A composition according to claim 1, wherein the further flame retardant is the aluminum salt of diethylphosphinic acid.

6. A composition according to claim 1, additionally comprising at least one further additive.

7. A composition according to claim 1, additionally comprising at least one further additive selected from the group consisting of antioxidants, UV absorbers, light stabilisers, metal deactivators, phosphites, phosphonites, hydroxylamines, nitrones, thiosynergistic compounds, peroxide-destroying compounds, polyamide stabilisers, basic co-stabilisers, nucleating agents, fillers, reinforcing agents, plasticisers, lubricants, emulsifiers, pigments, rheology additives, catalysts, flow improvers, optical brighteners, antistatics, blowing agents, benzofuranones and indolinones.

8. A composition according to claim 1, wherein the weight ratio of component b) to component c) is 1:10 to 10:1.

9. A composition according to claim 1, wherein the polyester polymer contains a reinforcing agent.

10. A process for flame retarding a polyester polymer, which process comprises applying thereto or incorporating therein
b) a compound of formula (I)-(X) and
c) a further flame retardant selected from salts of an organic phosphinic acid,

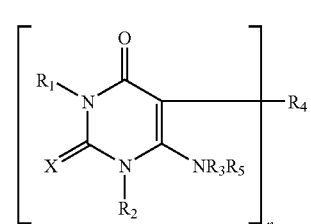
(I)

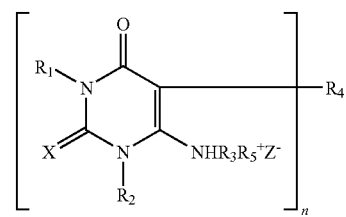
(II)

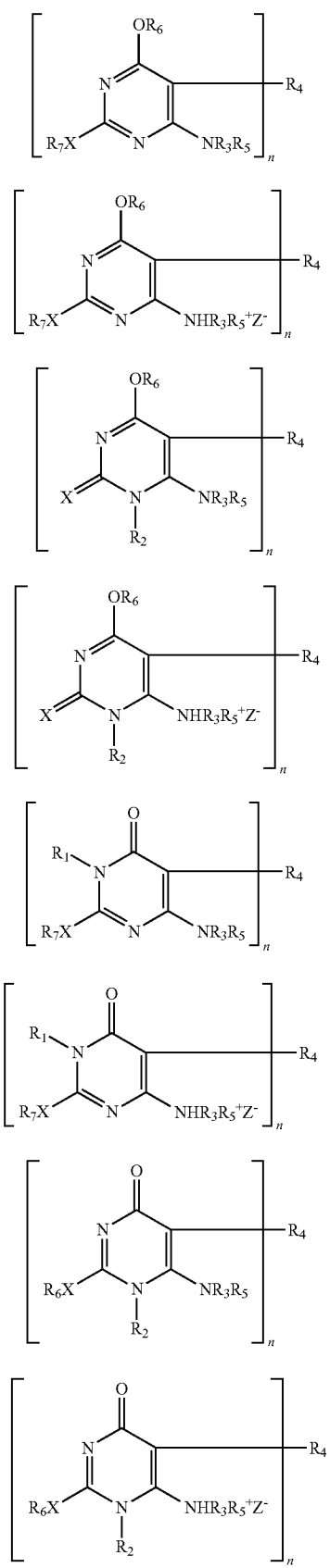

wherein
n is 1 or 2,
X is O, S or NH,
E is an anion of an inorganic acid,
$R_1$ and $R_2$ are independently of each other H, glycidyl, COO—$R_8$, OCO—$R_9$, CO—$R_9$, CO—$NR_8R_{10}$ or an unsubstituted or substituted radical selected from the group consisting of $C_1$-$C_{18}$alkyl, $C_3$-$C_{18}$alkenyl, $C_3$-$C_6$alkynyl, $C_5$-$C_8$cycloalkyl, $C_5$-$C_8$cycloalkenyl, $C_6$-$C_{12}$aryl, $C_7$-$C_{14}$aralkyl, $C_8$-$C_{12}$aralkenyl, $C_8$-$C_{12}$aralkynyl, $C_1$-$C_{18}$alkoxy, $C_3$-$C_{18}$alkenyloxy, $C_3$-$C_6$alkynyloxy, $C_6$-$C_{12}$aryloxy and $C_7$-$C_{14}$aralkoxy,
$R_3$ and $R_5$ are independently of each other as defined for $R_1$,
in case n is 1,
$R_4$ is halogen, NO, CN, $NR_3R_5$, $NHR_3R_5^+Z^-$, furanonyl or as defined for $R_1$,
in case n is 2,
$R_4$ is an unsubstituted or substituted biradical selected from the group consisting of $C_1$-$C_{18}$alkylene and $C_7$-$C_{14}$aralkylene,
$R_6$ is as defined for $R_1$,
$R_7$ is as defined for $R_2$,
$R_8$ and $R_{10}$ are independently of each other H or as defined for $R_9$;
$R_9$ is an unsubstituted or substituted radical selected from the group consisting of $C_1$-$C_{18}$alkyl, $C_3$-$C_{18}$alkenyl, $C_3$-$C_6$alkynyl, $C_5$-$C_8$cycloalkyl, $C_5$-$C_8$cycloalkenyl, $C_6$-$C_{12}$aryl, $C_7$-$C_{14}$aralkyl, $C_8$-$C_{12}$aralkenyl and $C_8$-$C_{12}$aralkynyl,
the substituted alkylene, aralkylene, alkyl, alkenyl, alkynyl, cycloalkyl, cycloalkenyl, aryl, aralkyl, aralkenyl, aralkynyl, alkoxy, alkenyloxy, alkynyloxy, aryloxy and aralkoxy are substituted by one or more radicals selected from the group consisting of halogen, hydroxy, nitro, cyano, COO—$R_{13}$, $CONR_{13}R_{14}$, OCO—$R_{15}$, $NR_{13}CO$—$R_{15}$, $NR_{13}R_{14}$, CO—$R_{15}$ and O—$R_{15}$,
or the substituted aralkylene, aryl, aralkyl, aralkenyl, aralkynyl, aryloxy and aralkoxy are substituted at the aryl by one or more radicals selected from the group consisting of $C_1$-$C_{18}$alkyl, $C_3$-$C_{18}$alkenyl and $C_3$-$C_6$alkynyl,
$R_{13}$ and $R_{14}$ are independently of each other H or as defined for $R_{15}$ and
$R_{15}$ is $C_1$-$C_{18}$alkyl, $C_3$-$C_{18}$alkenyl, $C_3$-$C_6$alkynyl, $C_5$-$C_8$cycloalkyl, $C_5$-$C_8$cycloalkenyl, $C_6$-$C_{12}$aryl, $C_7$-$C_{14}$aralkyl, $C_8$-$C_{12}$aralkenyl or $C_8$-$C_{12}$aralkynyl.

11. A process according to claim 10, wherein
n is 1 or 2,
X is O, S or NH,
$Z^-$ is $HSO_4^-$, $½SO_4^{2-}$, $HSO_3^-$, $½SO_3^{2-}$, $H_2PO_4^-$, $½HPO_4^{2-}$, $⅓PO_4^{3-}$, $H_3P_2O_7^-$, $½H_2P_2O_7^{2-}$, $⅓HP_2O_7^{3-}$, $¼P_2O_7^{4-}$, $H_4P_3O_{10}^-$, $½H_3P_3O_{10}^{2-}$, $⅓H_3P_3O_{10}^{3-}$, $¼H_3P_3O_{10}^{4-}$, $⅕H_3P_3O_{10}^{5-}$, $H_5P_4O_{13}^-$, $½H_4P_4O_{13}^{2-}$, $⅓H_3P_4O_{13}^{3-}$, $¼H_2P_4O_{13}^{4-}$, $⅕HP_4O_{13}^{5-}$, $⅙P_4O_{13}^{6-}$, $H_2PO_2^-$, $H_2PO_3^-$, $½HPO_3^{2-}$, $H_2BO_3^-$, $HBO_2^-$, $Cl^-$, $Br^-$, $I^-$, $ClO_4^-$, $(C_1$-$C_6$alkyl$)_2PO_2^-$, $(C_1$-$C_6$alkyl$)HPO_3^-$ or $½(C_1$-$C_6$alkyl$)PO_3^{2-}$,
$R_1$ and $R_2$ are independently of each other H, glycidyl, COO—$R_8$, OCO—$R_9$, CO—$R_9$, CO—$NR_8R_{10}$ or an unsubstituted or substituted radical selected from the group consisting of $C_1$-$C_{18}$alkyl, $C_3$-$C_{18}$alkenyl, $C_5$-$C_8$cycloalkyl, $C_5$-$C_8$cycloalkenyl, $C_6$-$C_{12}$aryl, $C_7$-$C_{14}$aralkyl, $C_8$-$C_{12}$aralkenyl, $C_1$-$C_{18}$alkoxy, $C_3$-$C_{18}$alkenyloxy, $C_6$-$C_{12}$aryloxy and $C_7$-$C_{14}$aralkoxy, $R_3$ and $R_5$ are independently of each other as defined for $R_1$, in case n is 1, $R_4$ is halogen, NO, CN, $NR_3R_5$, $NHR_3R_5^+Z^-$, furanonyl or as defined for $R_1$, in case n is 2, $R_4$ is an unsubstituted or substituted biradical selected from the group consisting of $C_1$-$C_{18}$alkylene and $C_7$-$C_{14}$aralkylene, $R_6$ is as defined for $R_1$, $R_7$ is as defined for $R_2$, $R_8$ and $R_{10}$ are independently of each other H or as defined for $R_9$;

$R_9$ is an unsubstituted or substituted radical selected from the group consisting of $C_1$-$C_{18}$alkyl, $C_3$-$C_{18}$alkenyl, $C_5$-$C_8$cycloalkyl, $C_5$-$C_8$cycloalkenyl, $C_8$-$C_{12}$aryl, $C_7$-$C_{14}$aralkyl and $C_8$-$C_{12}$aralkenyl, the substituted alkylene, aralkylene, alkyl, alkenyl, cycloalkyl, cycloalkenyl, aryl, aralkyl, aralkenyl, alkoxy, alkenyloxy, aryloxy and aralkoxy are substituted by one or more radicals selected from the group consisting of halogen, hydroxy, nitro, cyano, COO—$R_{13}$, CONR$_{13}$R$_{14}$, OCO—$R_{15}$, NR$_{13}$CO—$R_{15}$, NR$_{13}$R$_{14}$, CO—$R_{15}$ and O—$R_{15}$, or the substituted aryl, aralkylene, aralkyl, aralkenyl, aryloxy and aralkoxy are substituted at the aryl by one or more radicals selected from the group consisting of $C_1$-$C_{18}$alkyl and $C_3$-$C_{18}$alkenyl, $R_{13}$ and $R_{14}$ are independently of each other H or as defined for $R_{15}$ and $R_{15}$ is $C_1$-$C_{18}$alkyl, $C_3$-$C_{18}$alkenyl, $C_5$-$C_8$cycloalkyl, $C_5$-$C_8$cycloalkenyl, $C_8$-$C_{12}$aryl, $C_7$-$C_{14}$aralkyl or $C_8$-$C_{12}$aralkenyl.

12. A process according to claim 10, wherein n is 1 or 2,

X is O or NH, $Z^-$ is $HSO_4^-$, $½SO_4^{2-}$, $HSO_3^-$, $½SO_3^{2-}$, $H_2PO_4^-$, $½HPO_4^{2-}$, $⅓PO_4^{3-}$, $H_2PO_2^-$, $H_2PO_3^-$, $½HPO_3^{2-}$, $Cl^-$, $Br^-$, $I^-$, $(C_1$-$C_6$alkyl$)_2PO_2^-$, $(C_1$-$C_6$alkyl)$HPO_3^-$ or $½(C_1$-$C_6$alkyl)$PO_3^{2-}$, $R_1$ and $R_2$ are independently of each other H, glycidyl, COO—$R_8$, OCO—$R_9$, CO—$R_9$, or an unsubstituted or substituted radical selected from the group consisting of $C_1$-$C_{18}$alkyl, $C_3$-$C_6$alkenyl, $C_6$aryl, $C_7$-$C_{14}$aralkyl, $C_1$-$C_{18}$alkoxy, $C_6$-$C_{12}$aryloxy and $C_7$-$C_{14}$aralkoxy, $R_3$ and $R_5$ are independently of each other as defined for $R_1$, in case n is 1, $R_4$ is halogen, NO, CN, $NR_3R_5$, $NHR_3R_8^+Z^-$, furanonyl or as defined for $R_1$, in case n is 2, $R_4$ is an unsubstituted or substituted biradical selected from the group consisting of $C_1$-$C_{18}$alkylene and $C_7$-$C_{14}$aralkylene, $R_6$ and $R_7$ are H, $R_8$ is H or as defined for $R_9$;

$R_9$ is an unsubstituted or substituted radical selected from the group consisting of $C_1$-$C_{18}$alkyl, $C_3$-$C_6$alkenyl, $C_6$aryl and $C_7$-$C_{14}$aralkyl, the substituted alkylene, aralkylene, alkyl, alkenyl, aryl, aralkyl, alkoxy, aryloxy and aralkoxy are substituted by one or more radicals selected from the group consisting of halogen, hydroxy, nitro, cyano, COO—$R_{13}$, OCO—$R_{15}$, $NR_{13}R_{14}$, CO—$R_{15}$ and O—$R_{15}$, or the substituted aryl, aralkylene, aralkyl, aryloxy and aralkoxy are substituted at the aryl by one or more radicals selected from the group consisting of $C_1$-$C_{18}$alkyl and $C_3$-$C_6$alkenyl, $R_{13}$ and $R_{14}$ are independently of each other H or as defined for $R_{15}$ and $R_{15}$ is $C_1$-$C_{18}$alkyl, $C_3$-$C_6$alkenyl, $C_6$aryl or $C_7$-$C_{14}$aralkyl.

13. A process according to claim 10, wherein n is 1,

X is O or NH, $Z^-$ is $H_2PO_4^-$, $HSO_4^-$, $½SO_4^{2-}$, $Cl^-$ or $Br^-$, $R_1$ and $R_2$ are independently of each other H or an unsubstituted radical selected from the group consisting of $C_1$-$C_{18}$alkyl and $C_3$-$C_6$alkenyl, $R_3$ and $R_5$ are independently of each other as defined for $R_1$, $R_4$ is $NR_3R_5$, $NHR_3R_5^+Z^-$ or as defined for $R_1$ and $R_6$ and $R_7$ are H.

14. A process according to claim 10, for flame retarding a polyester polymer by applying thereto or incorporating therein a compound of formula (I), wherein n is 1, X is O, $R_1$ and $R_2$ are independently of each other H or $C_1$-$C_6$alkyl, and $R_3$, $R_4$ and $R_5$ are independently of each other as defined for $R_1$.

15. A process according to claim 10, for flame retarding polyester polymer polymer by applying thereto or incorporating therein a compound of formula (I), wherein n is 1, X is O, $R_1$ and $R_2$ are independently of each other H or $C_1$-$C_6$alkyl, and $R_3$, $R_4$ and $R_5$ are H.

16. A process according to claim 10 for flame retarding a polyester polymer, further comprising incorporating therein a reinforcing agent.

17. A process according to claim 10, wherein component b) is 6-aminouracil and the further flame retardant is the aluminium salt of diethylphosphinic acid.

18. A process according to claim 10, wherein the further flame retardant is the aluminium salt of diethylphosphinic acid.

19. A process according to claim 10 for flame retarding a polyester polymer, further comprising applying thereto or incorporating therein at least one further additive.

20. A process according to claim 10 for flame retarding a polyester polymer, further comprising applying thereto or incorporating therein at least one further additive selected from the group consisting of antioxidants, UV absorbers, light stabilisers, metal deactivators, phosphites, phosphonites, hydroxylamines, nitrones, thiosynergistic compounds, peroxide-destroying compounds, polyamide stabilisers, basic co-stabilisers, nucleating agents, fillers, reinforcing agents, plasticisers, lubricants, emulsifiers, pigments, rheology additives, catalysts, flow improvers, optical brighteners, antistatics, blowing agents, benzofuranones and indolinones.

* * * * *